US012757830B2

(12) United States Patent
Dunn

(10) Patent No.: US 12,757,830 B2
(45) Date of Patent: Oct. 13, 2026

(54) FLOATING CUTTERBAR ON ROTARY HEADER

(71) Applicant: MACDON INDUSTRIES LTD, Winnipeg (CA)

(72) Inventor: James Dunn, Winnipeg (CA)

(73) Assignee: MACDON INDUSTRIES LTD, Winnipeg (CA)

( * ) Notice: Subject to any disclaimer, the term of this patent is extended or adjusted under 35 U.S.C. 154(b) by 327 days.

(21) Appl. No.: 18/439,821

(22) Filed: Feb. 13, 2024

(65) Prior Publication Data

US 2024/0268268 A1 Aug. 15, 2024

Related U.S. Application Data

(60) Provisional application No. 63/445,020, filed on Feb. 13, 2023.

(51) Int. Cl.
*A01D 41/14* (2006.01)
*A01D 34/28* (2006.01)

(52) U.S. Cl.
CPC ............. *A01D 41/14* (2013.01); *A01D 34/28* (2013.01)

(58) Field of Classification Search
CPC ......... A01D 45/00; A01D 41/14; A01D 34/28
See application file for complete search history.

(56) References Cited

U.S. PATENT DOCUMENTS 5,203,150 A * 4/1993 Ryken .................. A01D 34/661 56/320.1
5,727,371 A * 3/1998 Kieffer ................... A01D 75/20 56/DIG. 15
5,896,733 A * 4/1999 Neuerburg ........... A01D 34/661 56/15.8
2014/0150391 A1* 6/2014 Enns .................... A01D 34/662 56/14.7

FOREIGN PATENT DOCUMENTS

EP 0634092 A1 1/1995

* cited by examiner

*Primary Examiner* — Brad Harcourt
(74) *Attorney, Agent, or Firm* — Miller Canfield

(57) ABSTRACT

A header for an agricultural machine including a support structure, a header frame, a floating cutterbar assembly, and a spring. The support structure may be adapted to mount the header to the agricultural machine. The header frame is pivotally coupled to the support structure. The floating cutterbar assembly is operatively coupled to the header frame and pivotally coupled to the support structure. The floating cutterbar assembly is moveable between a first position and a second position. The spring is coupled between the header frame and the floating cutterbar assembly for reducing a ground contact force on the cutterbar.

17 Claims, 20 Drawing Sheets

FLOATING CUTTERBAR ON ROTARY HEADER

CROSS-REFERENCE TO RELATED APPLICATIONS

The subject patent application claims priority to, and all the benefits of, United States Provisional Patent Application No 63/445,020, filed on Feb. 13, 2023, the entire contents of which are incorporated by reference herein.

BACKGROUND

Cutterbars are known to be attached to a rotary header of an agricultural machine to cut crops during a harvesting operation. In known configurations, the cutterbar, feed roll, and conditioner rolls are all fixed in relative position to each other and are rigidly attached to the rotary header frame. The whole assembly pivots or floats during operation in response to traversing uneven ground and when objects are encountered.

During use, it is desirable to maintain the cutterbar as close to the ground as possible to reduce the height of the stubble after crops are cut and to reduce the amount of dirt or ash gathered and accumulated with the cut crop during harvesting. If the cutterbar floats up, even a couple inches, the resulting stubble can be greater than 2 inches tall because it pushes the crop over once it floats up beyond a critical height. The taller the resulting stubble, the higher the amount of wear to rock guards and the greater the stress on the cutterbar. To maintain the position of the cutterbar as close to the ground as possible during operation, known cutterbar assemblies are configured to float extremely heavy on rotary headers to minimize vertical bouncing with respect to the ground.

Current known cutterbar configurations may be problematic due to the heavy load on the rotary header, potentially resulting in excessive wear to rock guards and stress on the cutterbar leading to cracks, oil loss, and gearbox failure. Further, cutterbar issues can result due to the high ground forces when obstacles are encountered during cutting, especially during high-speed cutting.

The heavier the header, such as when used in combination with a dual conditioner, the more frequently cutterbar issues may be experienced.

SUMMARY

According to one aspect, a header for an agricultural machine is provided. The header may comprise a support structure, a header frame, a floating cutterbar assembly, and a spring. The support structure may be adapted to mount the header to the agricultural machine. The header frame is pivotally coupled to the support structure. The floating cutterbar assembly is operatively coupled to the header frame and pivotally coupled to the support structure. The floating cutterbar assembly is moveable between a first position and a second position. The spring is coupled between the header frame and the floating cutterbar assembly for reducing a ground contact force on the cutterbar.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

Figure 1:
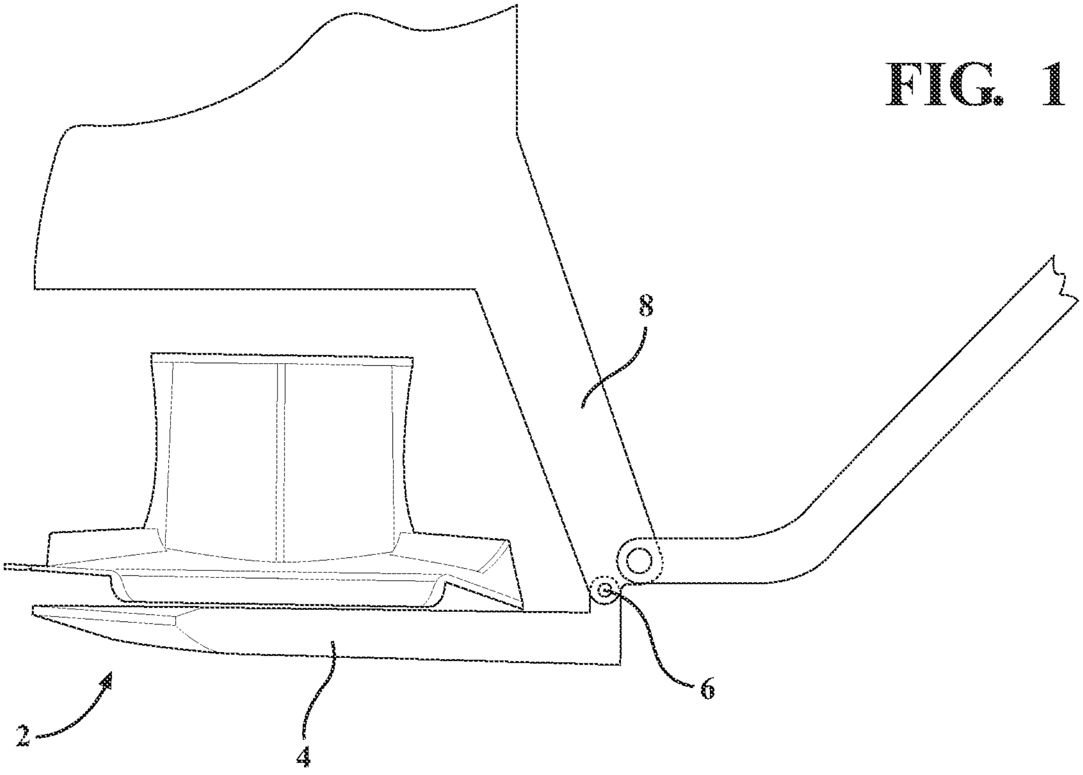
FIG. 1 is a partial side view of a first embodiment of a floating cutterbar assembly attached to a rotary header.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. The terminology will include the words specifically mentioned, derivatives thereof, and words of similar import.

DETAILED DESCRIPTION

Figure 2:
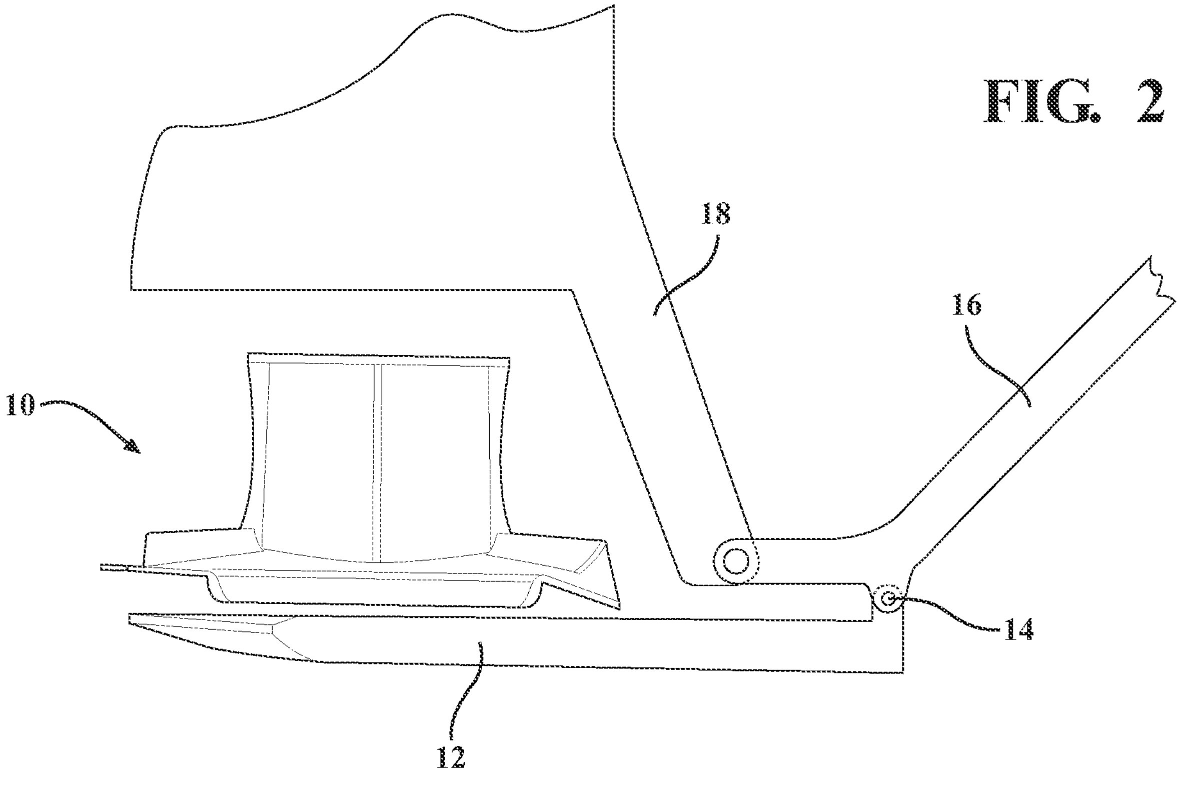
FIG. 2 is a partial side view of a second embodiment of a floating cutterbar assembly attached to a rotary header.
Figure 3:
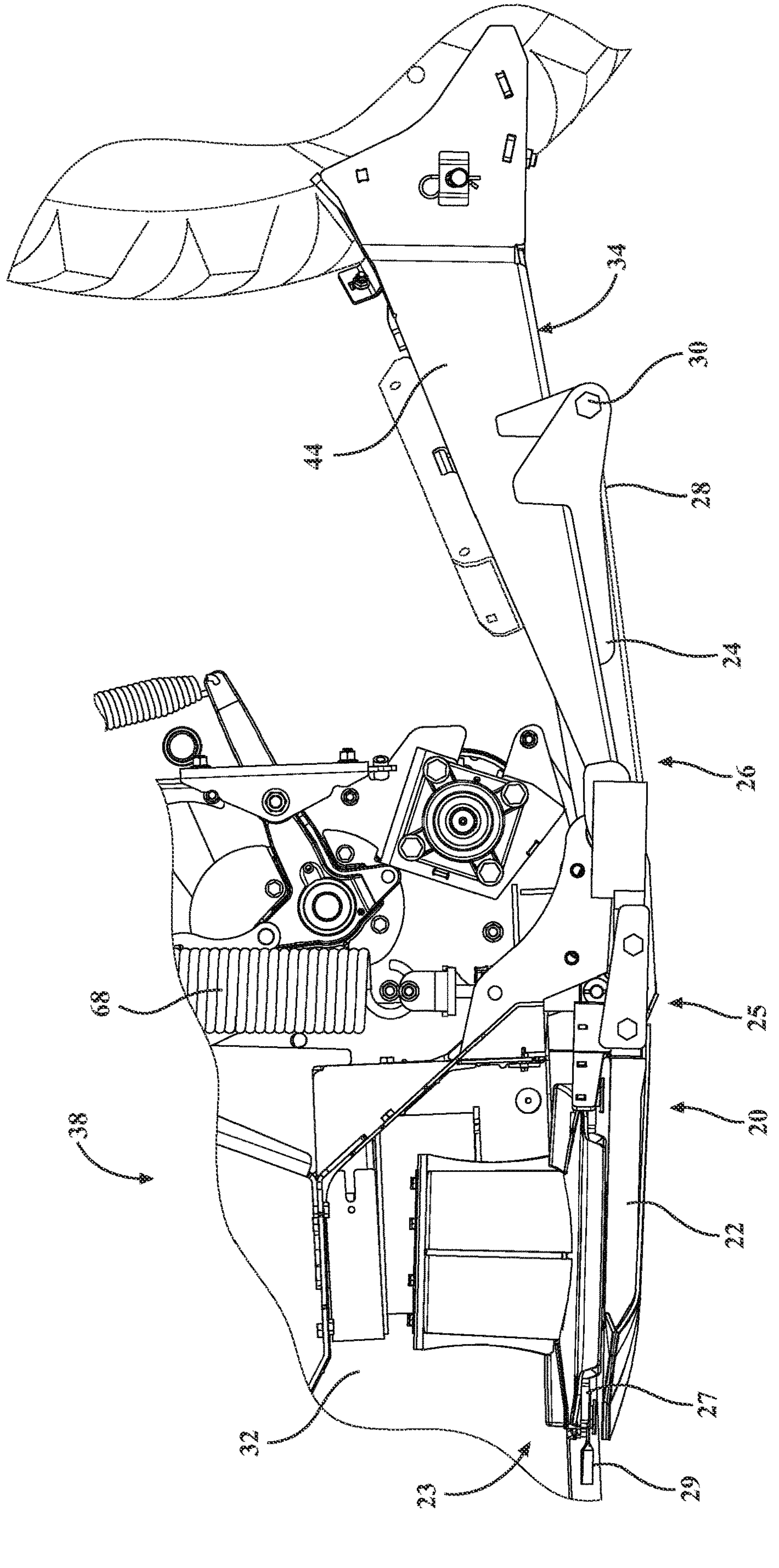
FIG. 3 is a partial side view of a third embodiment of a floating cutterbar assembly attached to a rotary header.

Referring to the Figures, wherein like numerals indicate like or corresponding parts throughout the several views, a floating cutterbar assembly on a rotary header is shown generally at 2 in the first embodiment illustrated in FIG. 1, a floating cutterbar assembly is shown generally at 10 in the second embodiment illustrated in FIG. 2, and a floating cutterbar assembly is shown generally at 20 in the third embodiment illustrated beginning in FIG. 3. Each of the floating cutterbar assemblies is pivotally connected to a header of an agricultural machine so that is moves independently with respect to the header. More specifically, the cutterbar assembly includes a cutterbar that is pivotally connected to a support structure that is connected to the header. The support structure may include the header frame, such as is illustrated in FIG. 1, a lift linkage that is connected to the header frame, such as is illustrated in FIG. 2, or a float arm 24 that is connected to the header frame and the lift linkage, such as is illustrated in FIG. 3.

Referring to FIG. 1, in the first embodiment, a cutterbar 4 is pivotally connected by a pivot connection 6 directly to a header frame 8 of the header. Referring to FIG. 2, in the second embodiment, a cutterbar 12 is pivotally connected by a pivot connection 14 to a lift linkage 16. The lift linkage 16 connects a header frame 18 of the header to the agricultural machine (not shown in this Figure) and assists in supporting the header frame 18.

Figure 4:
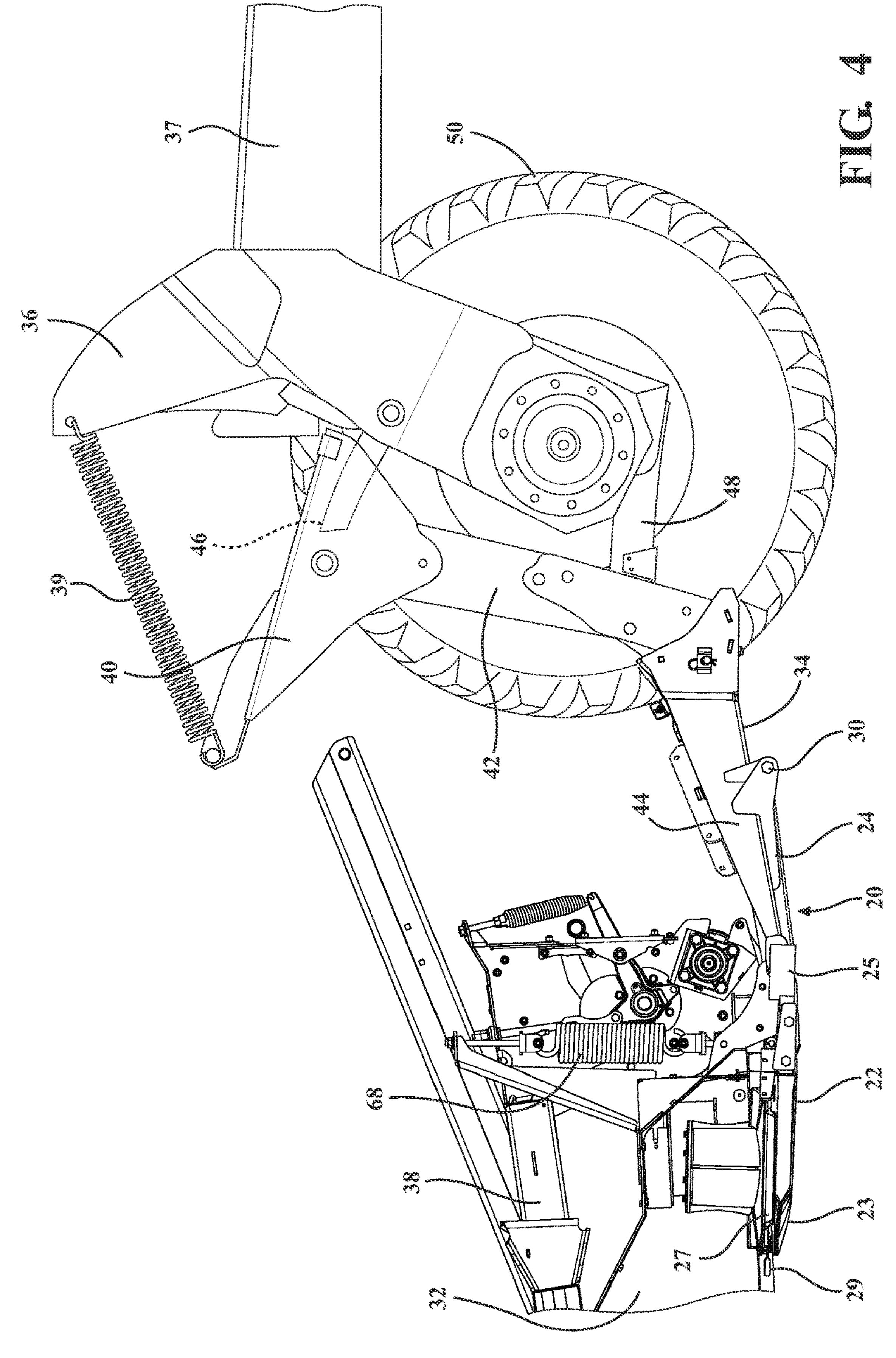
FIG. 4 is a partial side view of the floating cutterbar assembly illustrated in FIG. 3 attached to a rotary header showing the lift linkage attached to an agricultural machine and supporting the header.

Referring to FIG. 3, in the third embodiment, a rotary header 38 is partially shown including the floating cutterbar assembly 20 having a cutterbar 22. The header 38 may further include a float arm 24 having a first end 26 and a second end 28, wherein the first end 26 of the float arm 24 is pivotally attached to the cutterbar 22 and the second end 28 of the float arm 24 is pivotally attached by a pivot connection 30 to a lift linkage 34, which may be referred to as the float system. In this third embodiment the support structure comprises the lift linkage 34. Referring to FIG. 4, the lift linkage 34 pivotally connects a rotary header frame 32 of the rotary header 38 to a frame 36 of an agricultural machine, for example a windrower 37. Said differently, the support structure, which includes the lift linkage 34, is adapted to mount the header 38 to the agricultural machine 37, and the header frame 32 is pivotally coupled to the support structure. Further, the floating cutterbar assembly 20 is operatively coupled to the header frame 32 and pivotally coupled to the support structure.

The cutterbar 22 has a front side 23 including a series of discs 27 each including exposed knives 29, wherein each disc 27 rotates causing the exposed knives 29 to cut crops during operation. Opposite from the front side 23 of the cutterbar 22 is the rear side 25 of the cutterbar 22.

The agricultural machine 37 further includes wheels 50, which support the frame 36 of the agricultural machine 37 for operation. The lift linkage 34 supports the weight of the header 38 and helps distribute the forces encountered by the header 38. The lift linkage 34 generally includes an upper section 40, a middle section 42, and a lower section 44. Further, the lift linkage 34 may be connected to the frame 36 of the agricultural machine 37 by an upper float link 46 and a lower float link 48. The upper float link 46 and lower float link 48 are connected to the middle section 42 of the lift linkage 34. Further, the upper float link 46 and the lower float link 48 are generally parallel to each other. A float tension spring 39 may be connected between the upper section 40 of the lift linkage 34 on one side and to the agricultural machine frame 36 on the other side. The float tension spring 39 acts to lift the float system, or lift linkage 34, and carry the weight of the header 38. The float tension spring 39 supports the weight of the header 38 and the lift linkage allowing the header 38 to follow the contours of a field with reduced ground pressure as the header 38 and the agricultural machine 37 move through the field of crops.

As the agricultural machine 37 moves across a field, the upper float link 46 and lower float link 48 of the lift linkage 34 work in combination to control the generally vertically up and down motion of the header 38 with respect to the ground. The floating cutterbar assembly 20 further allows for the cutterbar 22 to move generally vertically up and down with respect to the ground independently from the vertical motion of the header 38. By separating the floating movement of the cutterbar 22 from the floating movement of the header 38, the force required to move either is reduced. Additionally, the movement of the header 38 has a reduced influence on the movement of the cutterbar 22, allowing the cutterbar to more closely follow the contours of the field, which allows the crops to be cut more closely to the ground thereby increasing yield.

Figure 5:
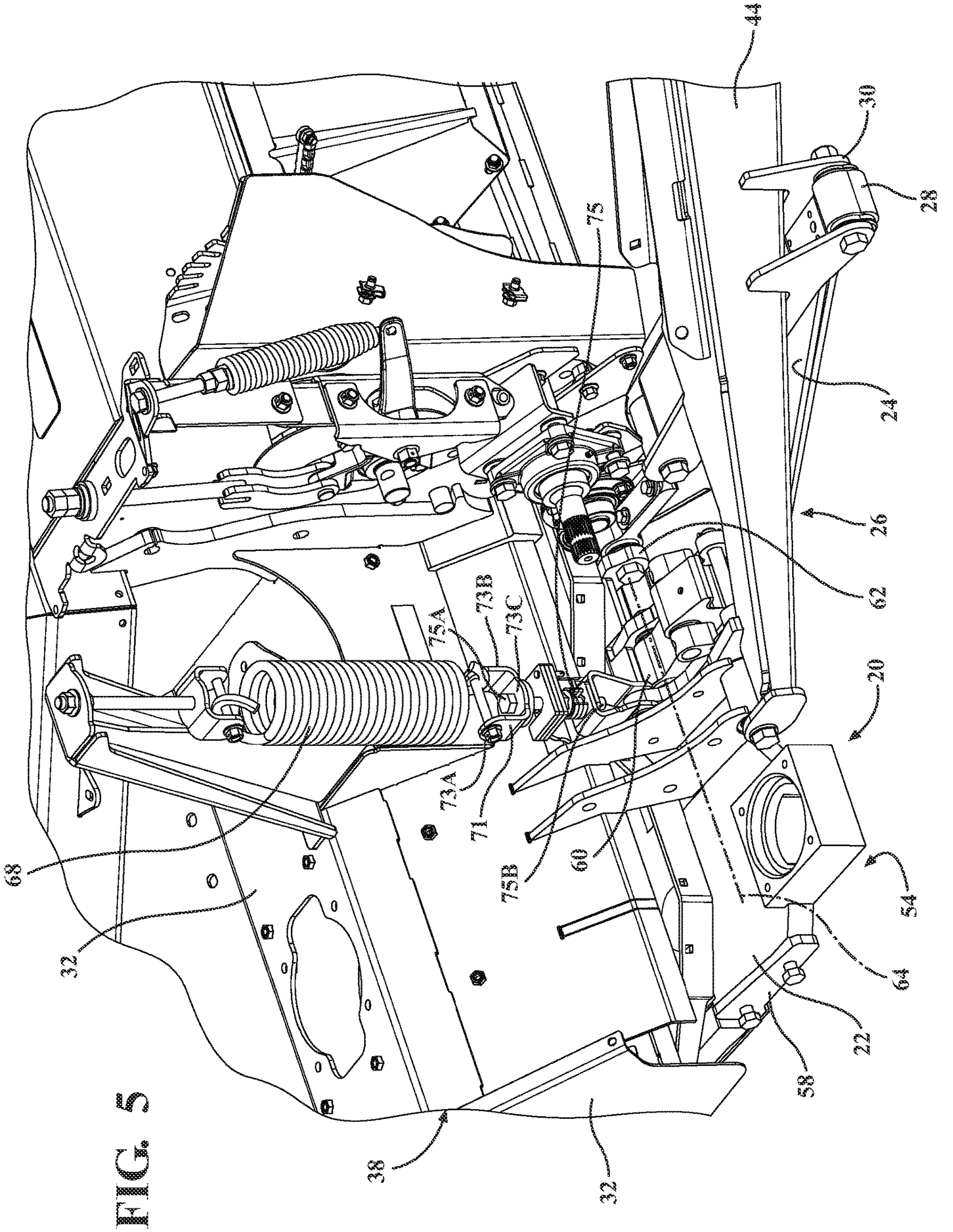
FIG. 5 is a partial perspective view from above of a section of the floating cutterbar assembly illustrated in FIG. 3.
Figure 6:
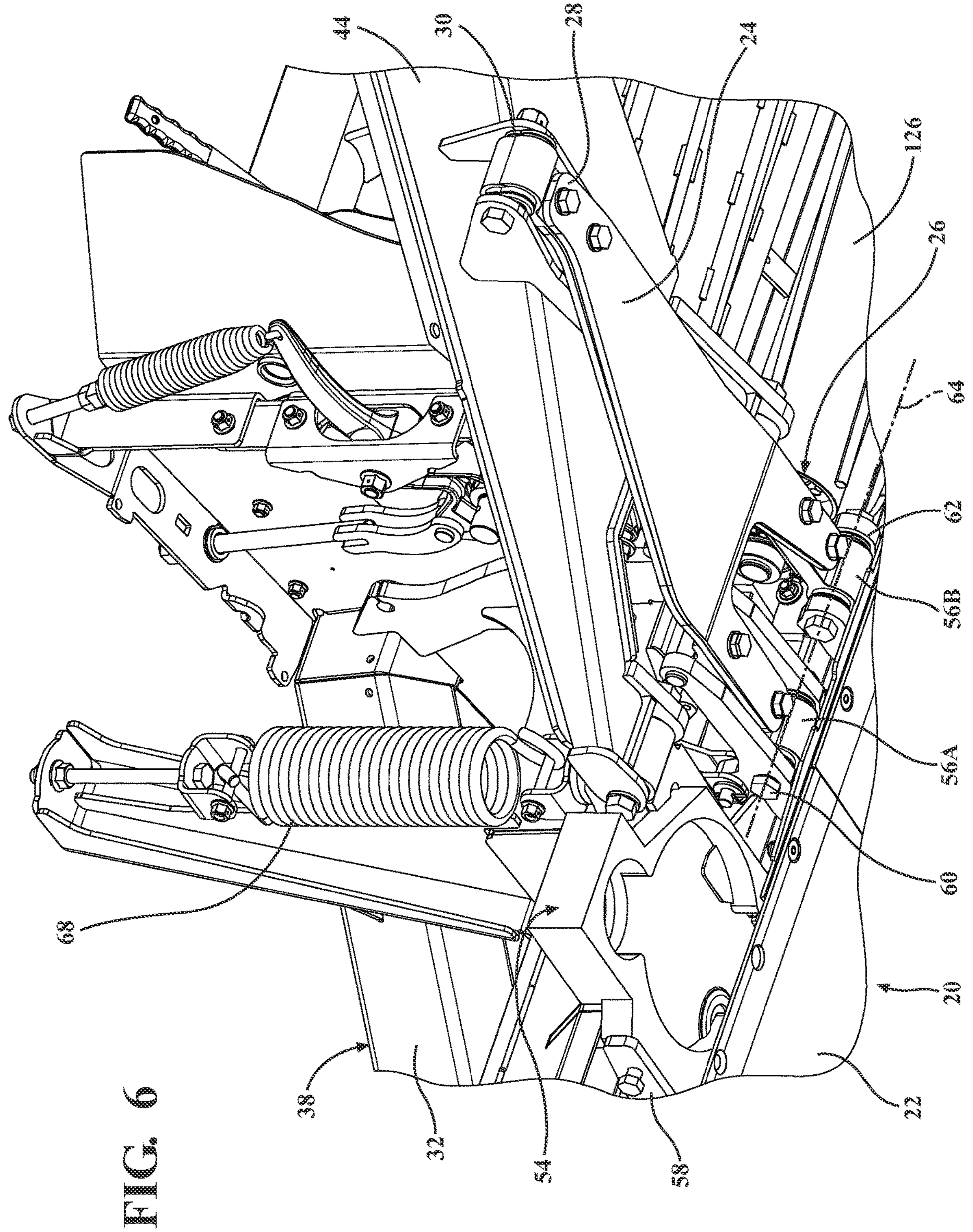
FIG. 6 is a partial perspective view from below of a section of the floating cutterbar assembly illustrated in FIG. 3.

FIG. 5 illustrates a perspective view from above, looking down on the cutterbar assembly 20 at a first side 58 of the cutterbar 22. FIG. 6 illustrates a perspective view from below, looking up at the cutterbar assembly 20 of the present invention at the first side 58 of the cutterbar 22. Referring to FIG. 6, the float arm 24 has a generally Y-shaped body. The first end 26 of the float arm 24 has two parallel extensions, a first parallel extension 56A and a second parallel extension 56B. The end of each parallel extension 56A, 56B at the first end 26 of the float arm 24 is attached to the rear side 54 of the cutterbar 22. The first parallel extension 56A of the float arm 24 meets with the cutterbar 22 at a first connection point 60 and the second parallel extension 56B of the float arm 24 meets with the cutterbar 22 at a second connection point 62.

In the illustrated embodiment, the first connection point 60 and the second connection point 62 are each a pivotal connection that facilitates pivoting movement of the cutterbar 22. The first connection point 60 and the second connection point 62 are in alignment and define a generally horizontal axis 64 that extends through the center of each connection point 60, 62 around which the cutterbar 22 pivots. However, in an alternative embodiment, the first connection point 60 and the second connection point 62 could be rigid connections. The second end 28 of the float arm 24 is connected to the lower section 44 of the lift linkage 34 by pivotal connection 30.

Figure 7A:
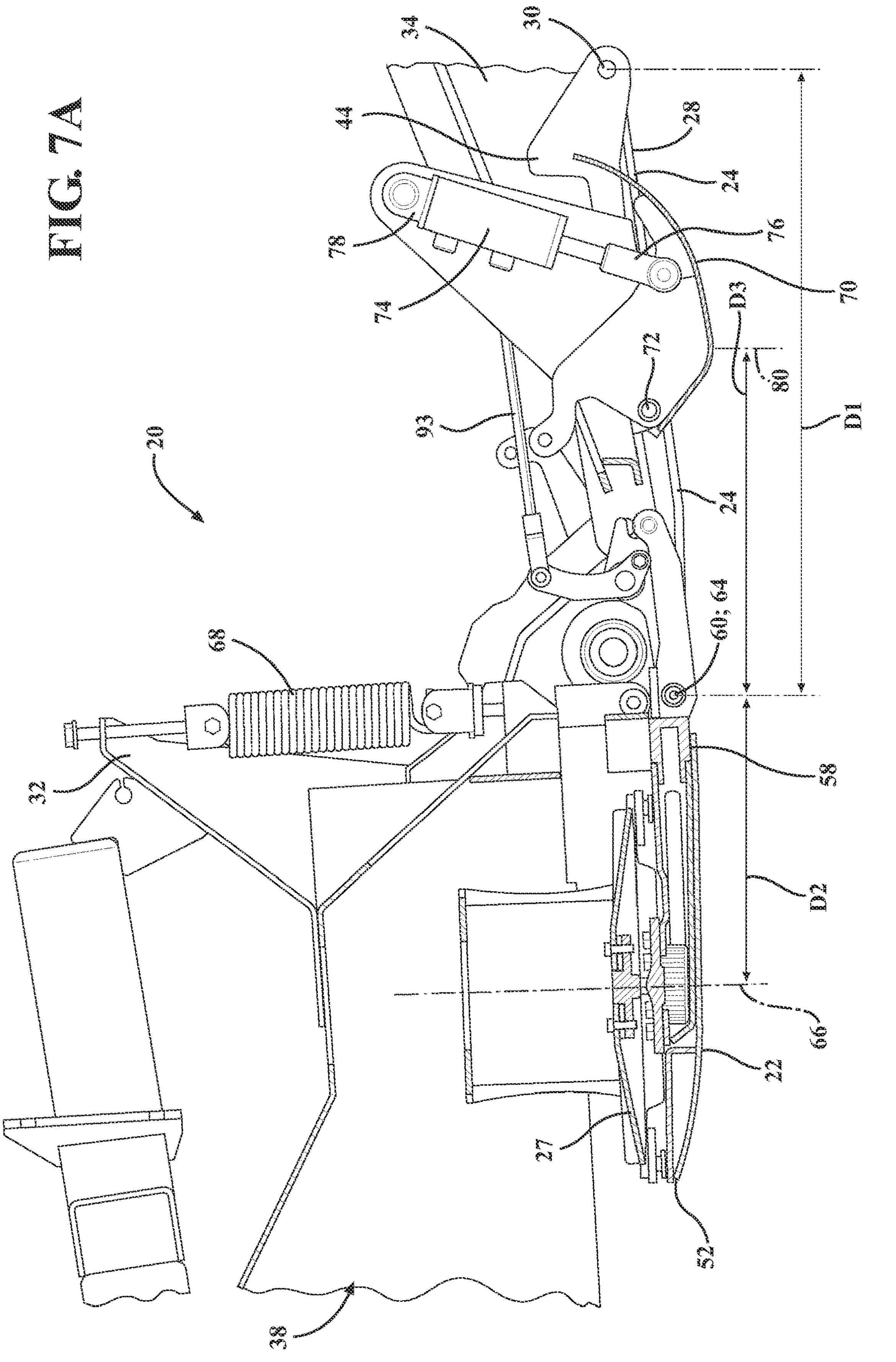
FIG. 7A is a partial side view of the floating cutterbar assembly illustrated in FIG. 3.
Figure 7B:
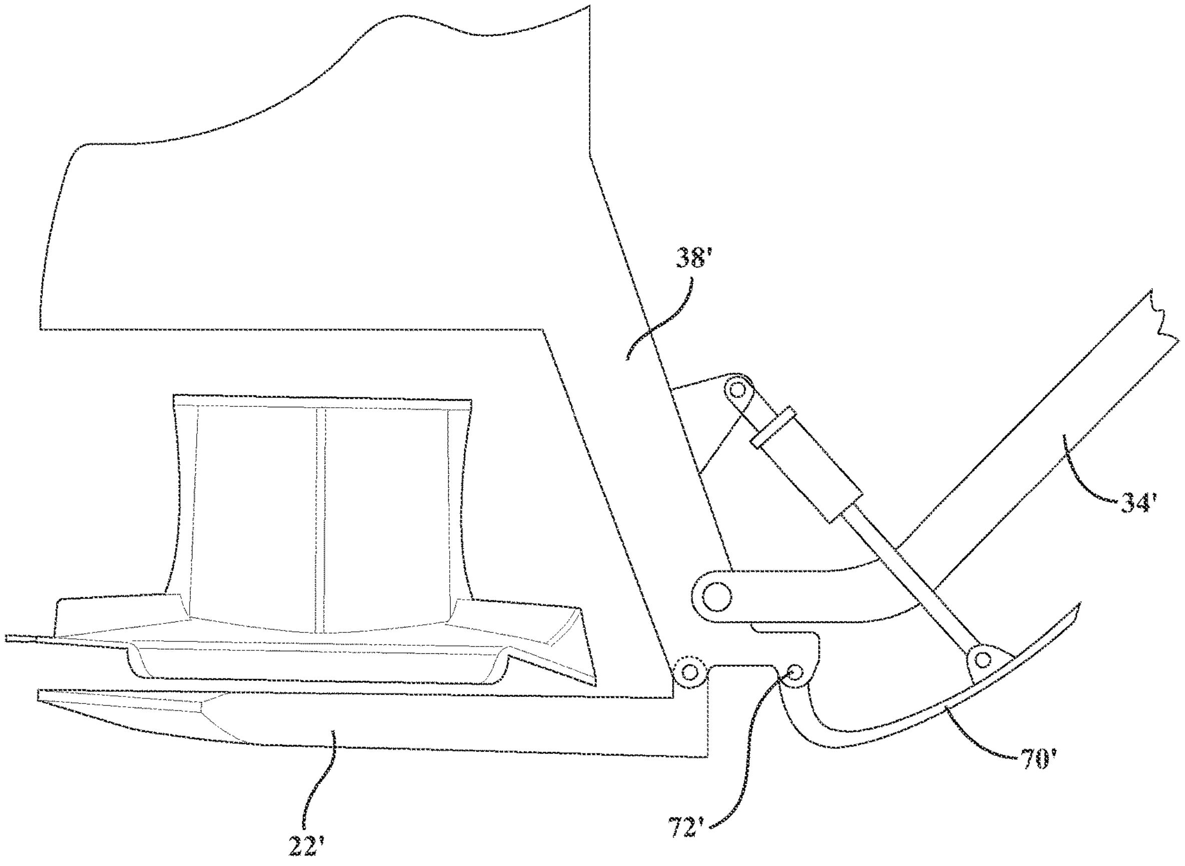
FIG. 7B is a partial side view of an alternative embodiment of the floating cutterbar assembly.

In the exemplary embodiment illustrated in FIG. 7A, the distance D1 between pivot connection 30, which is where the second end 28 of the float arm 24 and the lower section 44 of the lift linkage 34 connect, and the axis 64, which runs through the centers of connection point 60 and connection point 62, may be 745 millimeters (mm). Further, the rotation of the outermost disc 27 rotates defines a generally vertical axis 66. The outermost disc 27 is positioned along the first side 58 of the cutterbar 22. The distance D2 between the center of the outermost disc 27, which is in alignment with the axis 66, and the cutterbar tilt pivot, which is the axis 64 running through the centers of connection points 60 and 62, may be 346 millimeters (mm). The ranges for the D1 and D2 dimensions are determined by the overall dimensions of the assembly. In one exemplary embodiment, the range for the D1 dimension may be 745 millimeters+/−500 millimeters and the range for the D2 dimension may be 346 millimeters+/−200 millimeters.

Figure 8:
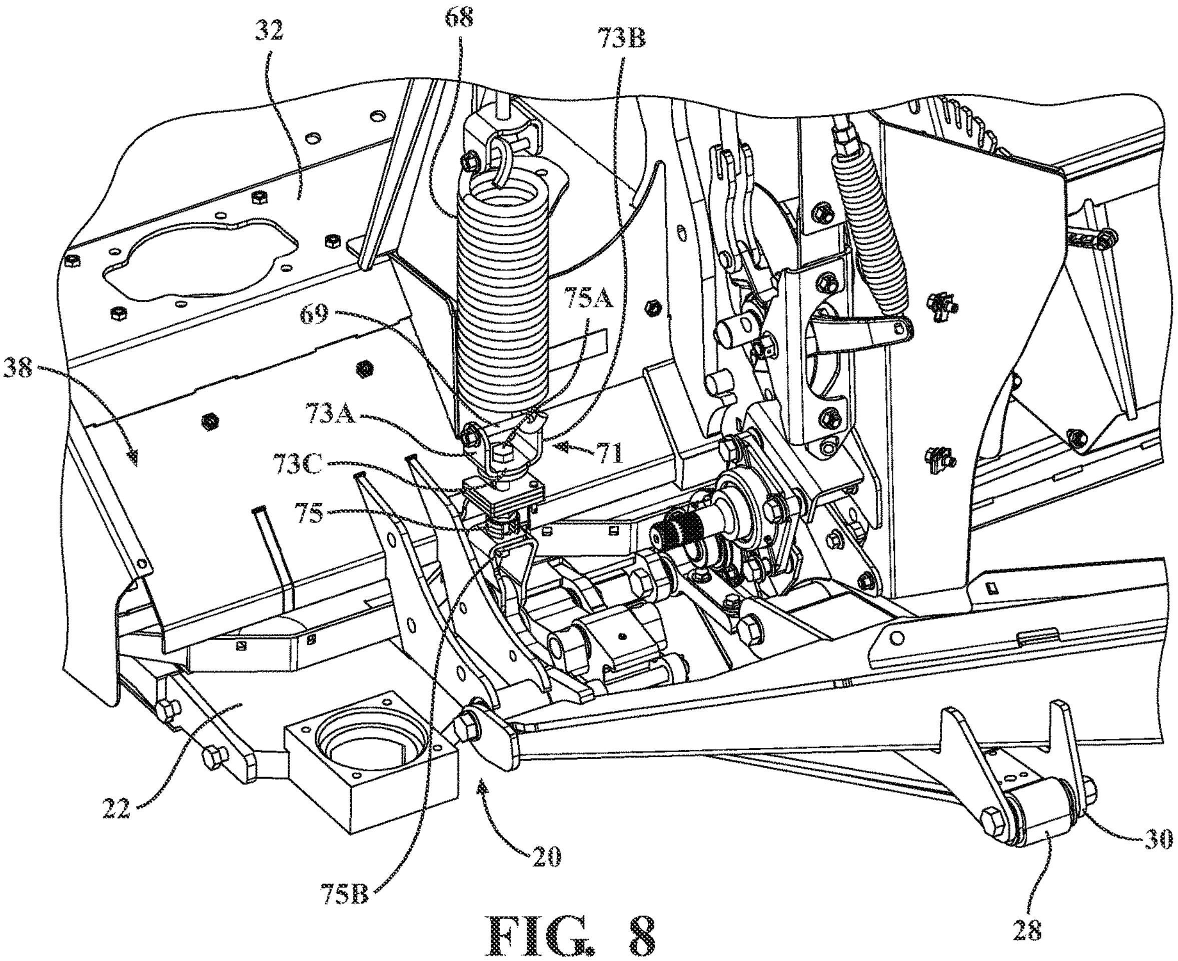
FIG. 8 is a partial perspective view from above of a section of the floating cutterbar assembly illustrated in FIG. 3 at the top of its float travel and attached to a header.
Figure 9:
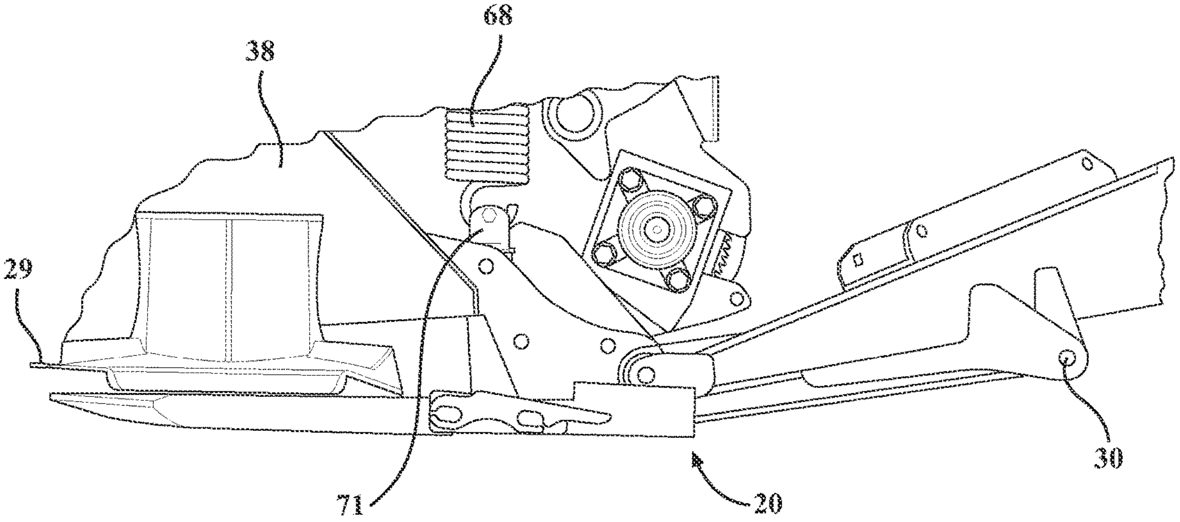
FIG. 9 is a partial side view of the floating cutterbar assembly illustrated in FIG. 3 at the top of its float travel and attached to a header.
Figure 10:
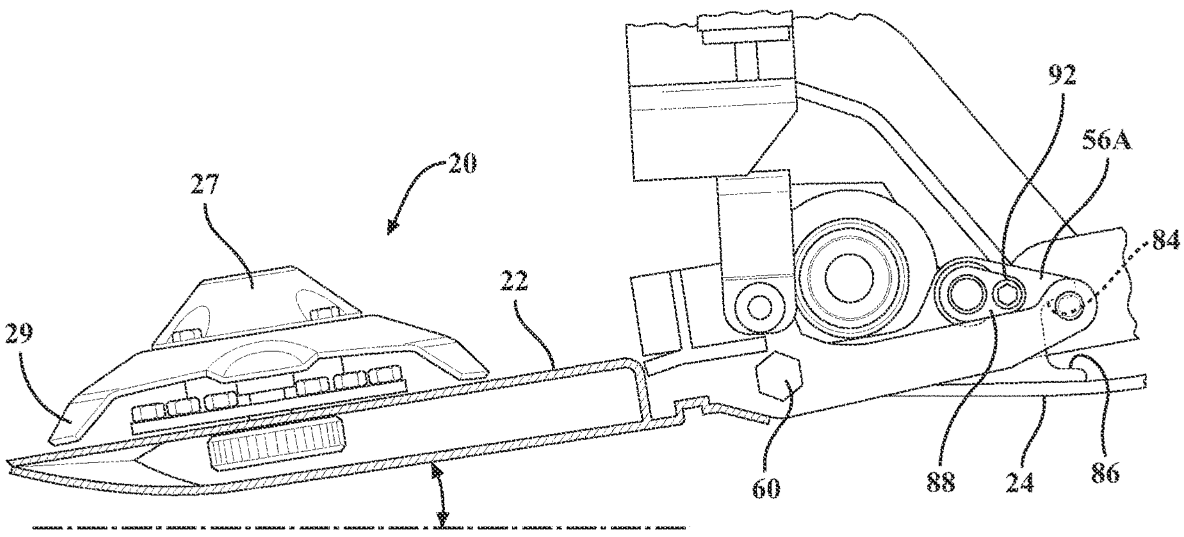
FIG. 10 is a partial side view of the floating cutterbar assembly illustrated in FIG. 3 at the bottom of its float travel and attached to a header.

The floating cutterbar assembly 20 is movable between a first position and a second position. In the first position (FIG. 22), the cutterbar 22 is pivoted downward relative to the header frame 32. Conversely, in the second position (FIG. 23), the cutterbar 22 is pivoted upward relative to the header frame 32. In operation, the cutterbar 22 pivots from a central position (FIG. 21) vertically upward to an upper limit of approximately 50 millimeters (mm) and pivots from a central position vertically downward to a lower limit of approximately 50 millimeters (mm), independently from the header 38. As a result, the cutterbar 22 can move independently from the header frame 32 as it passes over undulating terrain and obstacles in its path within a range of about 100 millimeters (mm). FIGS. 3-7A illustrate the cutterbar 22 in the central position. FIGS. 8-9 illustrate the cutterbar 22 at the top of its float travel. FIG. 10 illustrates the cutterbar 22 at the bottom of its float travel.

It is desirable to maintain the cutterbar 22 in a neutral or central position during operation. To assist with maintaining this positioning and assist in supporting the weight of the cutterbar 22, at least one spring 68 is optionally attached to and positioned between the header frame 32 and the floating cutterbar assembly 20. The embodiment, illustrated most clearly in FIGS. 5, 6, 8, and 9, includes a spring 68. The spring 68 aids in supporting the weight of the cutterbar assembly 20 and the cutterbar 22 and further reduces the ground contact force that is applied to the cutterbar 22 but allows for the cutterbar 22 to move in response to traversal of undulating terrain or encountered obstacles. The combination of the pivotal connection 30, between the float arm 24 and the lift linkage 34, and the spring 68 allows the cutterbar 22 to “float” over the ground and obstacles during operation. If a force encountered is large enough it will cause the header frame 32 to vertically move in response as well as the cutterbar 22.

Referring to FIG. 8, the spring 68 is part of a spring assembly that includes an integrated stop 69, which limits the vertical range of motion of the cutterbar 22 relative to header 38. Referring to FIGS. 5 and 8, the spring 68 is attached to the header frame 32 at an upper end and is attached to a U-shaped member 71 at a lower end. The U-shaped member 71 comprises three sides, a first side 73A, a second side 73B, and a third side 73C that is attached to and extends between the first side 73A and the second side 73B. The lower end of the spring 68 is attached to the integrated stop 69. The first side 73A and the second side 73B of the U-shaped member 71 each have an aperture that receives a rod that acts as the stop 69. The third side 73C of the U-shaped member 71 also has an aperture that receives an upper end 75A of a member 75. The member 75 has a lower end 75B that is connected to the cutterbar 22.

Contraction or expansion of the spring 68 in response to movement of the cutterbar 22 causes the lower end of the spring 68 and the attached U-shaped member 71 to move relative to the member 75 until the stop 69 interacts with the top 75A of member 75. Once the top 75A of the member 75 abuts the stop 69, the cutterbar 22 is prevented from pivoting or tilting any further in that direction of travel.

One challenge that arises due to the incorporation of the spring 68 is difficulty in setting the spring 68 with precision to maintain the cutterbar 22 at or near its center or neutral position within its vertical travel range. To aid with this challenge, a support mechanism 70 is optionally utilized, such as a skid shoe, a wheel, or a roller. In a first embodiment illustrated in FIGS. 7A, 11-13, and 20-24, the support mechanism is a skid shoe 70. The skid shoe 70 is pivotally attached to the lift linkage 34. In an alternative implementation illustrated in FIG. 7B, the support mechanism 70' is pivotally attached to the header 38' at a pivot connection 72'. The addition of the support mechanism, i.e., the skid shoe 70, helps to maintain the cutterbar 22 at or near its center or neutral vertical position, even when an obstacle is encountered, by contacting the ground during operation, guiding the header 38 over the ground, and supporting the cutterbar 22.

Referring again to the first implementation illustrated in FIGS. 7A and 11-13, the skid shoe 70 is pivotally connected, at a pivot connection 72, to the lower section 44 of the lift linkage 34. The skid shoe 70 can be adjusted to an optimum position allowing the cutterbar's 22 position to be maintained near its center or default position during travel over flat ground. Referring to the exemplary implementation illustrated in FIG. 7A, the distance D3 between the first connection point 60, which is the axis 64 running through first connection point 60 and second connection point 62, and a contact point 80 where the skid shoe 70 contacts the ground is approximately 412 millimeters (mm).

Figure 11:
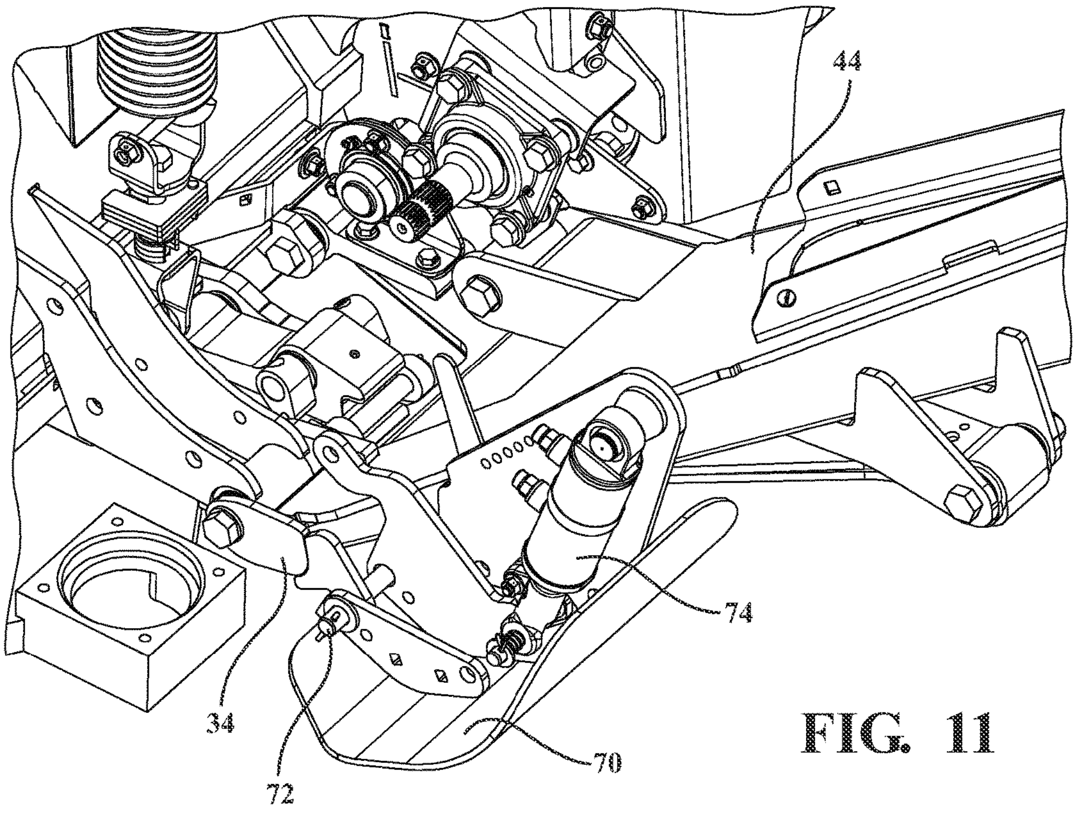
FIG. 11 is a partial perspective view of the floating cutterbar assembly illustrated in FIG. 3 including a skid shoe.
Figure 12:
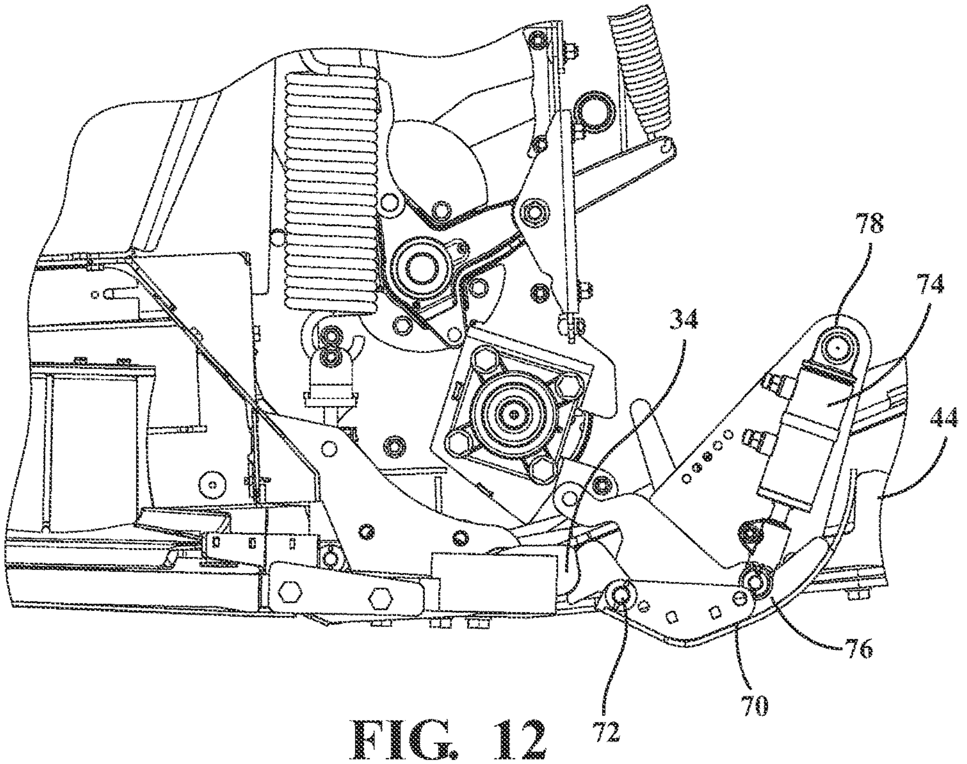
FIG. 12 is a partial side view of the floating cutterbar assembly illustrated in FIG. 3 including a skid shoe.
Figure 13:
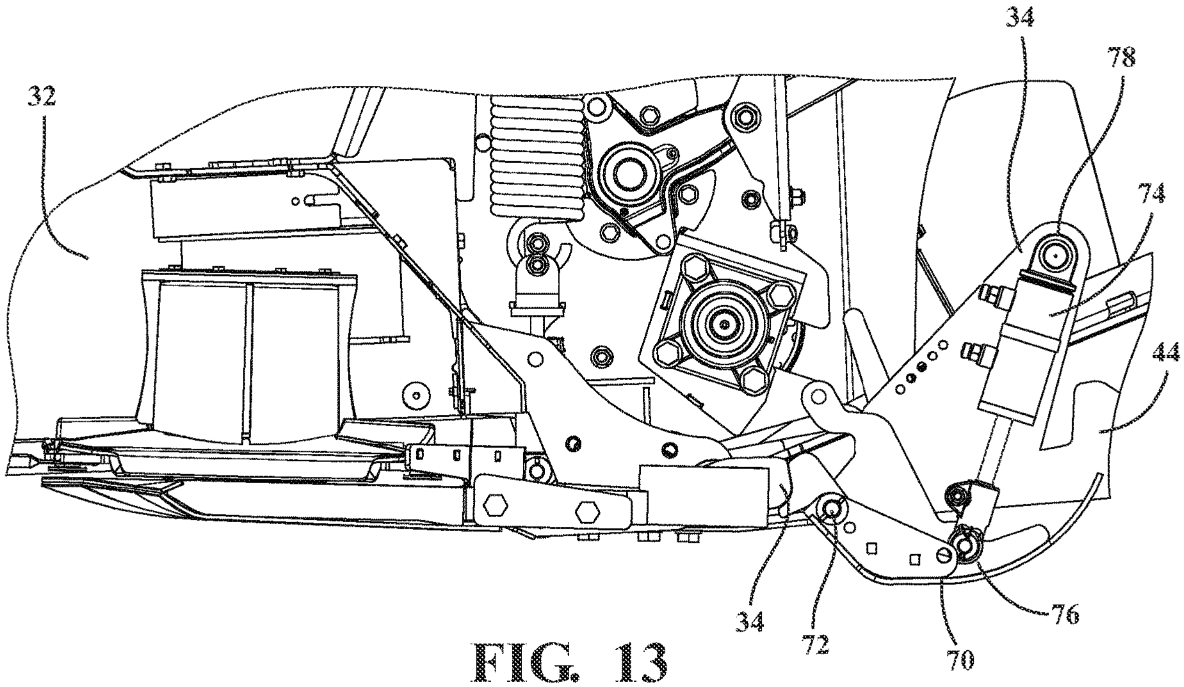
FIG. 13 is a partial side view of the floating cutterbar assembly illustrated in FIG. 3 including a skid shoe.

Further, an actuator, shown here as a hydraulic cylinder actuator 74, can be used in combination with the support mechanism, in the illustrated case a skid shoe 70, to further control the position and orientation of the support mechanism 70 which, in turn, impacts the height of the header 38 above the ground. The hydraulic cylinder actuator 74 has a lower end 76 that is attached to the support mechanism 70, i.e., the skid shoe. The hydraulic cylinder actuator 74 has an upper end 78, opposite from the lower end 76, that is attached to the support structure, which can be either the lift linkage 34 or the header frame 32. In FIGS. 11-13, the upper end 78 of the hydraulic cylinder actuator 74 is attached to the lower section 44 of the lift linkage 34. Further, FIG. 13 illustrates the hydraulic cylinder actuator 74 extended which pushes down the skid shoe 70 to its fully extended position, resulting in raising the header frame 32 and lift linkage 34 vertically up from the ground. The actuator, although shown as a hydraulic cylinder actuator 74 in the illustrated embodiment, could alternatively be an electric linear actuator or a manually controlled actuator.

It is desirable to position the cutterbar 22 as close to the ground as possible to cut the crop as close to the ground as possible and promote lifting the crop upward if it is lying horizontally. The ability of the cutterbar 22 to pivot relative to the cutterbar float arm 24 about the axis 64 defined by the first and second connection points 60, 62, results in more pivotal flexibility of the cutterbar 22 to be positioned close to the ground during operation.

Figure 14:
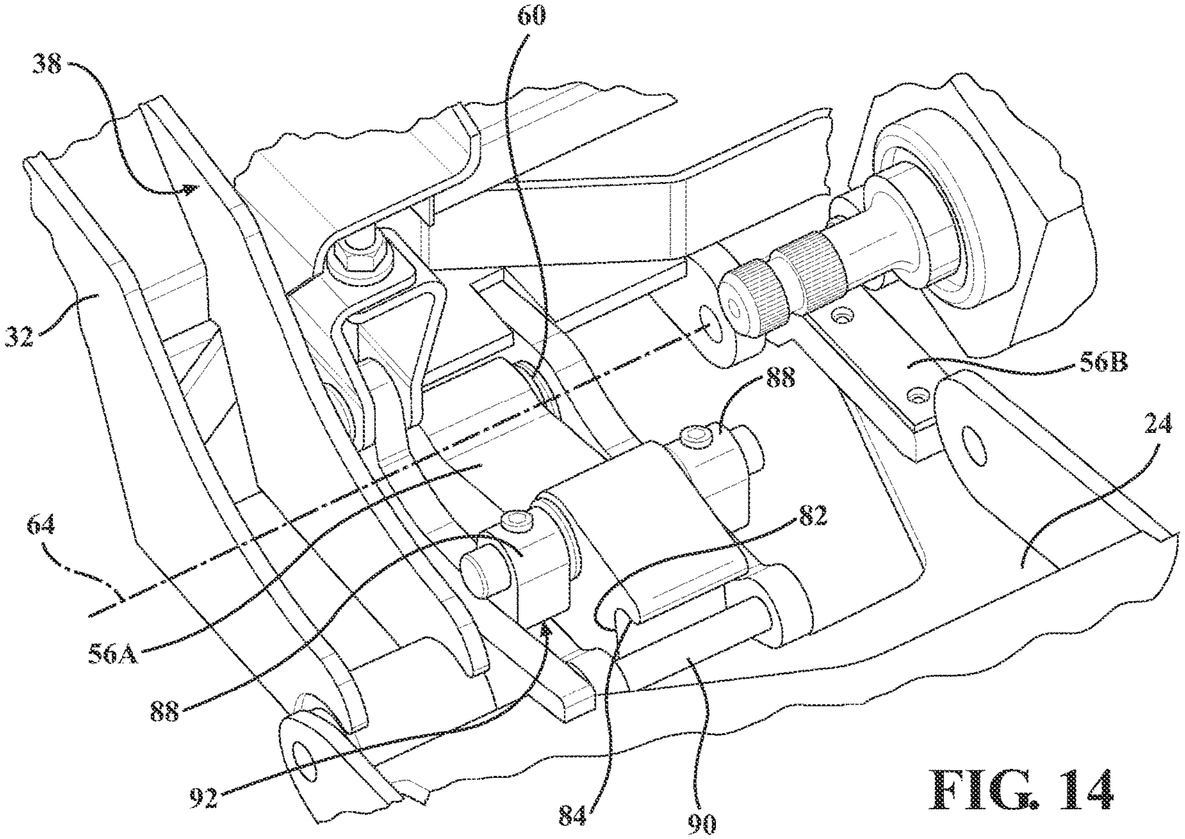
FIG. 14 is a partial perspective view from above of a section of the floating cutterbar assembly illustrated in FIG. 3.
Figure 15:
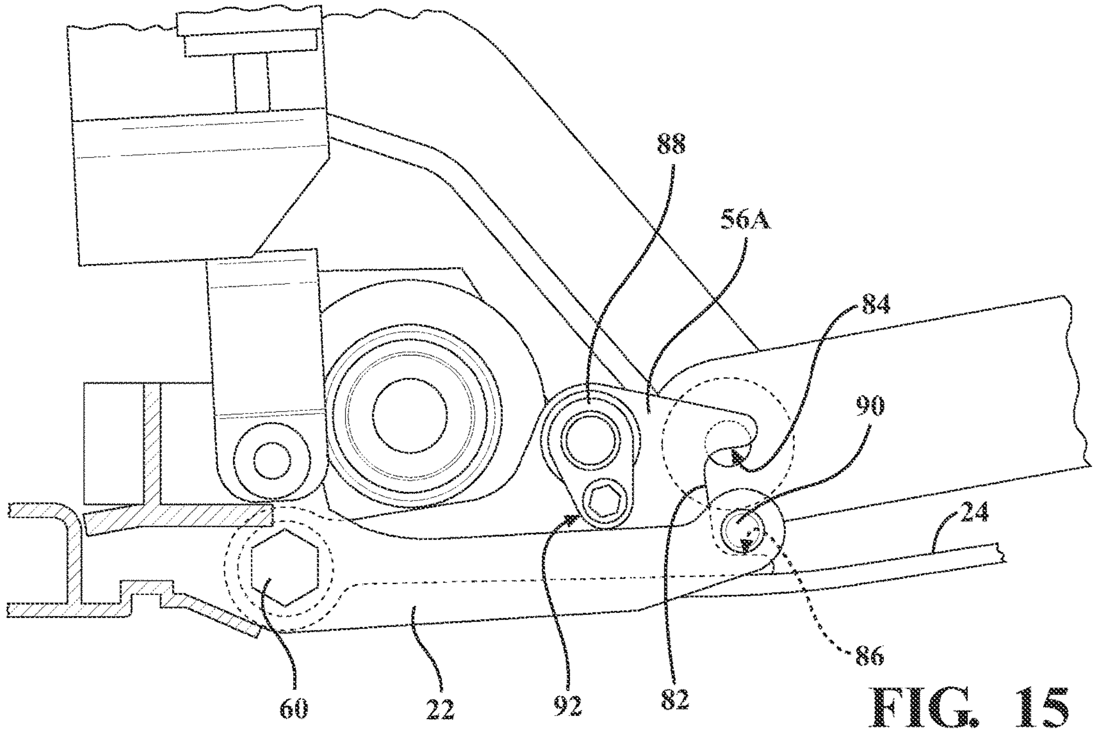
FIG. 15 is a partial side view of a section of the floating cutterbar assembly illustrated in FIG. 3.

However, to control the pivot range between the cutterbar 22 and the float arm 24, stops are integrated into the design. Referring to FIGS. 14 and 15, the first parallel extension 56A of the float arm 24 includes a generally C-shaped recess 82 defined between a first wall 84 that is a tilt down stop and a second wall 86 that is a tilt up stop. There is a rod 90 attached to the cutterbar 22, that is positioned within the C-shaped recess 82 and interacts with the first wall 84 and the second wall 86 to limit the pivotal, or tilting, range of motion of the cutterbar 22. When the rod 90 encounters the first wall 84 of the C-shaped recess 82, the cutterbar 22 has reached its maximum downward pivot or tilt. When the rod 90 encounters the second wall 86 of the C-shaped recess 82, the cutterbar 22 has reached its maximum upward pivot or tilt. These limitations define the cutterbar's pivotal range of motion.

Further, referring to FIG. 10, a cam 88 can be attached to the first parallel extension 56A of the float arm 24 to further aid in adjusting the tilt angle of the cutterbar 22. The cam 88 is rotatable and generally pear shaped. Rotation of the cam 88 adjusts the pivotal range of motion of the cutterbar 22 with respect to the ground. Said differently, the cam 88 is rotatable between a first position (FIG. 10) and a second position (FIG. 18) and arranged to limit the pivotal range of motion of the cutterbar 22 in the second position. When the cam 88 is rotated, as shown in FIG. 10, so that the narrower end 92 of the pear-shaped cam 88 is oriented rearwardly, the cutterbar 22 is not restricted by the cam 88 from pivoting fully within a pivotal range vertically up and down. It is, however, restricted by the tilt down stop 84 and the tilt up stop 86 that are each located on the first parallel extension 56A of the float arm 24. When the cam 88 is in the position illustrated, the cutterbar 22 is tilted downwardly, and when the cutterbar 22 encounters an obstacle during operation, the cutterbar 22 will tilt or pivot vertically up to pass over the obstacle. After passing the obstacle, the weight of the cutterbar 22 pulls the front side 23 of the cutterbar 22 back down toward the ground. This feature results in reduced impact loading on the cutterbar 22 when an obstacle is encountered and increased flexibility in the pivotal range of the cutterbar 22, also referred to as the cutterbar float, when cutting at a steep cutterbar tilt angle.

Figure 16:
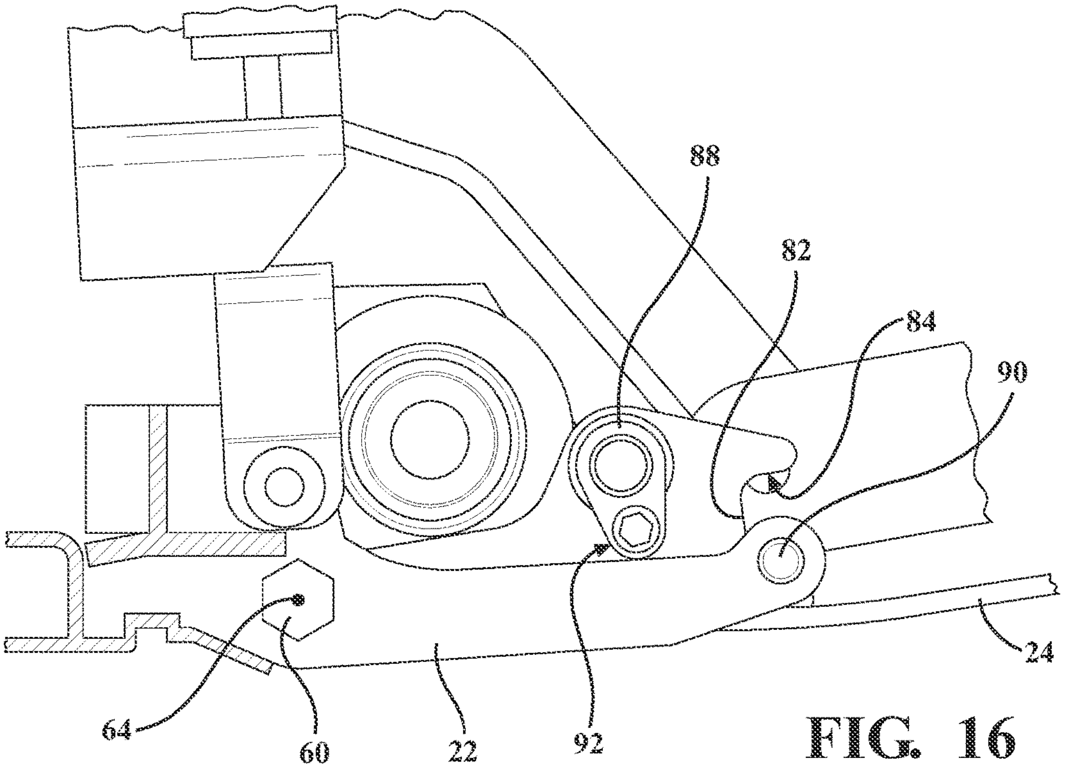
FIG. 16 is a partial side view of a section of the floating cutterbar assembly illustrated in FIG. 3.
Figure 17:
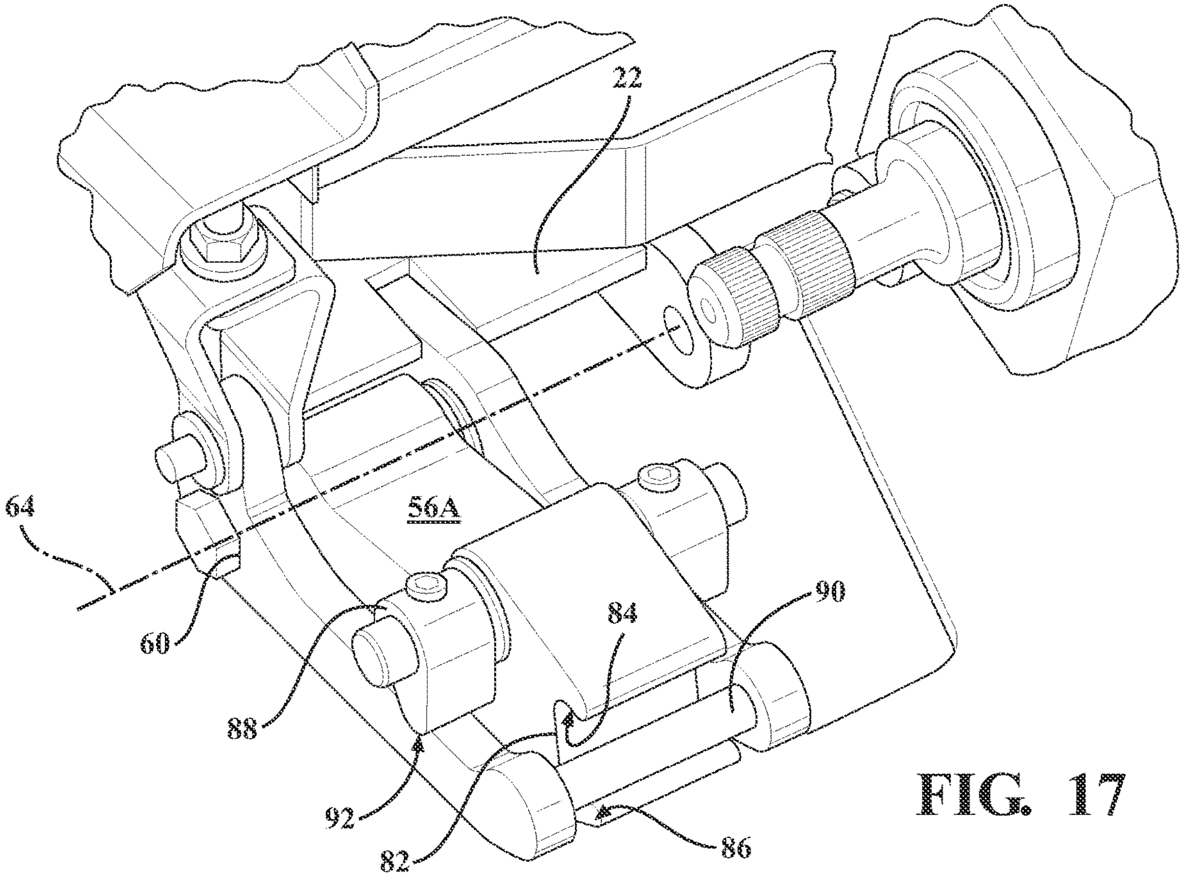
FIG. 17 is a partial perspective view of a section of the floating cutterbar assembly illustrated in FIG. 3.
Figure 18:
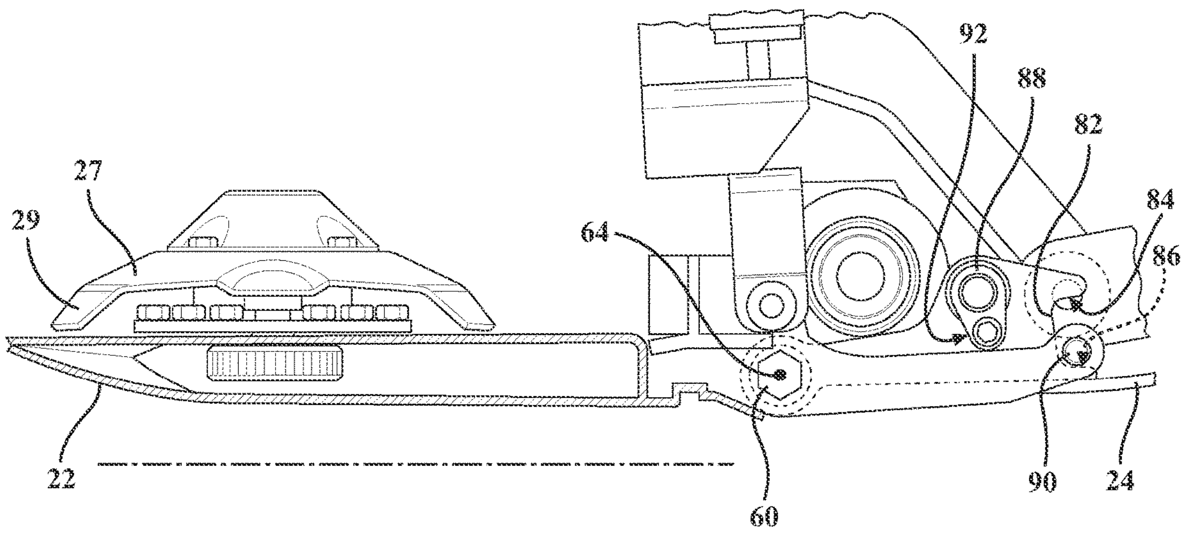
FIG. 18 is a partial side view of a section of the floating cutterbar assembly illustrated in FIG. 3.

Conversely, as shown in FIGS. 16-18, the cam 88 is rotated into the second position with the narrower end 92 of the pear-shaped cam 88 oriented downwardly, resulting in a more limited pivotal range of motion of the cutterbar 22. Here, as the cutterbar 22 pivots downwardly the cutterbar 22 contacts the narrow end 92 of the cam 88 before the rod 90 contacts the first wall 84 of the c-shaped recess 82.

The cutterbar 22 can be tilted relative to the float arm 24 about the axis 64 moving upwardly in its float travel as the front side 23 of the cutterbar 22 pivots, or tilts, more forwardly in a downward direction. In this position there is less room for the cutterbar 22 to float upwardly before reaching the tilt up stop 86.

Figure 19:
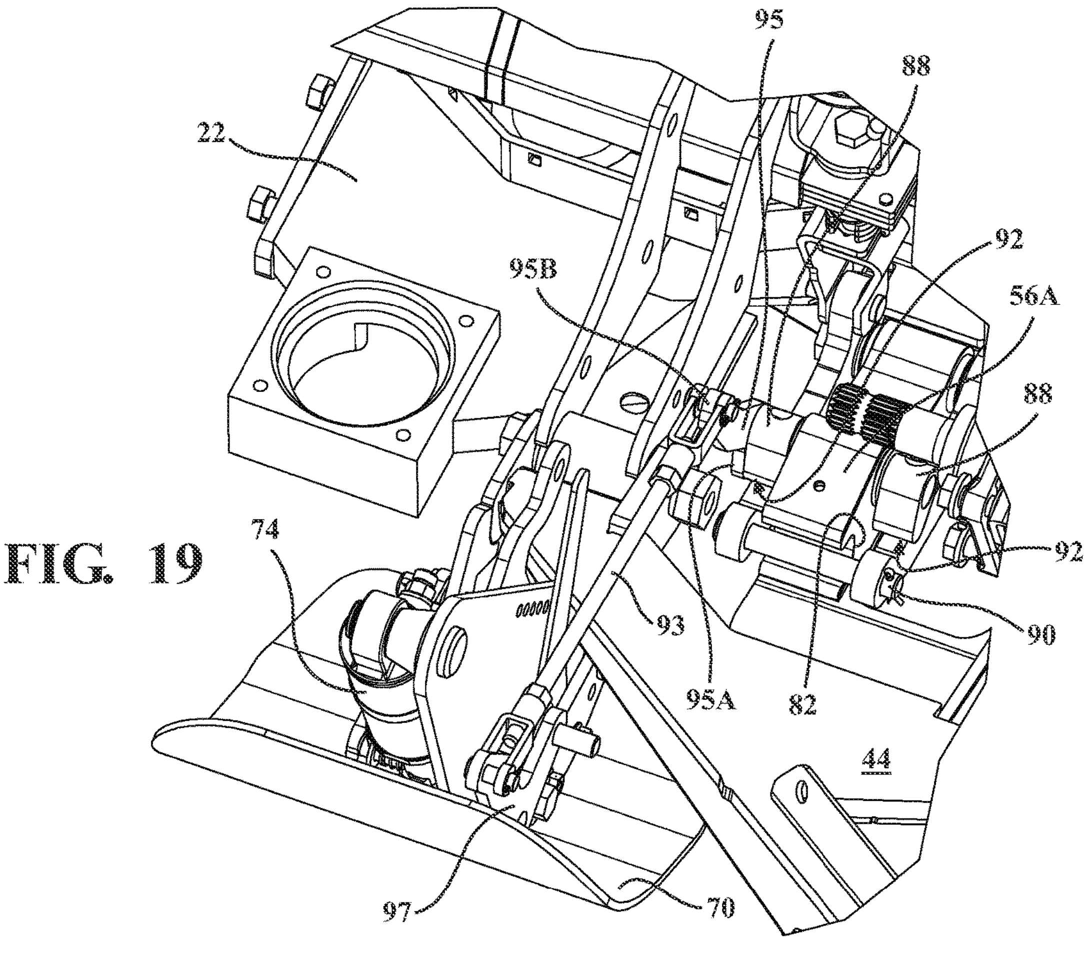
FIG. 19 is a partial perspective view of a section of the floating cutterbar assembly illustrated in FIG. 3 including a linkage between the cutterbar and support mechanism.

As mentioned above, the support mechanism, shown as a skid shoe 70, can be manually adjusted using the hydraulic cylinder actuator 74. When the skid shoe 70 is adjusted in a downward direction (FIG. 22), it results in raising the header frame 32 relative to the ground, along with the tilt up stop 86, to position the cutterbar 22 near the center of its vertical float travel. Referring to FIG. 19, the cutterbar 22 and skid shoe 70, are operably connected by a linkage 93. More specifically, a first side of the linkage 93 is connected to the cam 88 and a second side of the linkage 93 is connected to t the skid shoe 70 (support mechanism side). An arm 95 is attached to the cam 88 at a first end 95A and at a second end 95B is attached to the linkage 93. The second side of the linkage 93 is attached to a pivot mechanism 97 which is attached to the skid shoe 70. Due to this linkage 93 connection, actuation of the hydraulic cylinder actuator 74 controls movement of both the cutterbar 22 and the skid shoe 70. The skid shoe 70 and cam 88 work together due to the linkage 93 to tilt the cutterbar 22 and raise the header frame 32 to maintain the cutterbar 22 near the middle of its vertical float range. Said differently, when the hydraulic cylinder actuator 74 extends to position the skid shoe 70 in the lowered position (FIG. 22), movement of the skid shoe 70 is transferred to the pivot mechanism 97 and to the linkage 93, which rotates the cam 88 into the first position (FIG. 10) and allows the cutterbar 22 to pivot within the full pivoting range. When the hydraulic cylinder actuator 74 retracts to position the skid shoe 70 in the raised position (FIG. 20), movement of the skid shoe 70 is transferred to the pivot mechanism 97 and to the linkage 93, which rotates the cam 88 into the second position (FIG. 18) and restricts the pivoting movement of the cutterbar 22. If the hydraulic cylinder actuator 74 moves the skid shoe 70 to the raised position while the cutterbar 22 is in the downward pivoted position, the cam 88 will lift the cutterbar 22 into the neutral position.

Figure 20:
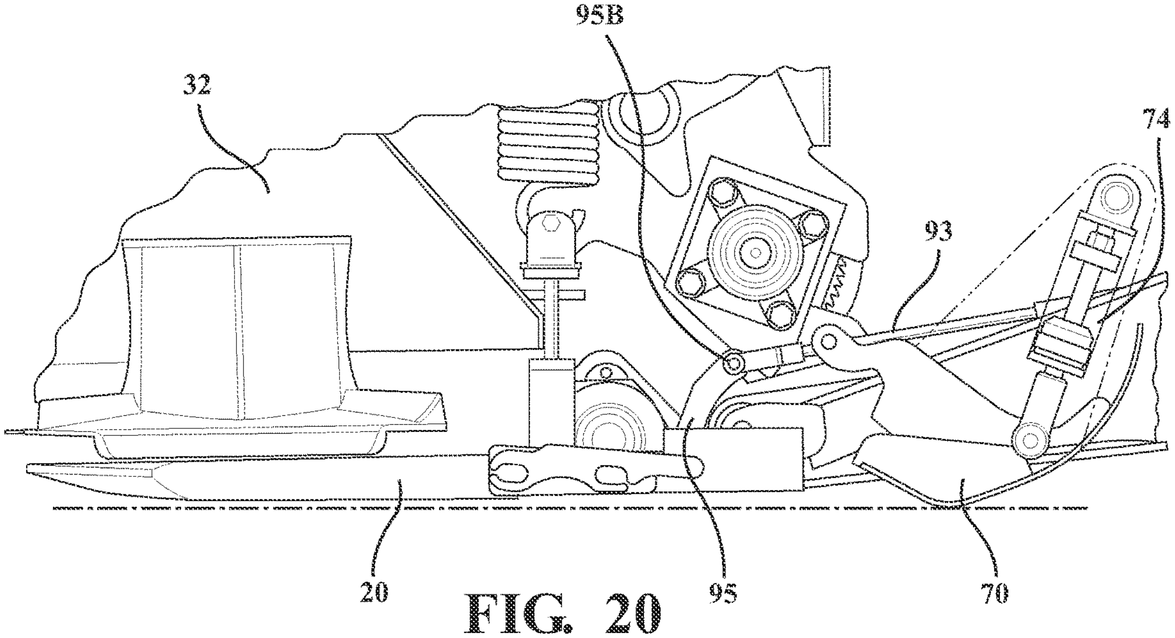
FIG. 20 is a side view of the floating cutterbar assembly illustrated in FIG. 3 at the top of its float travel, attached to a header, and including a support mechanism.
Figure 21:
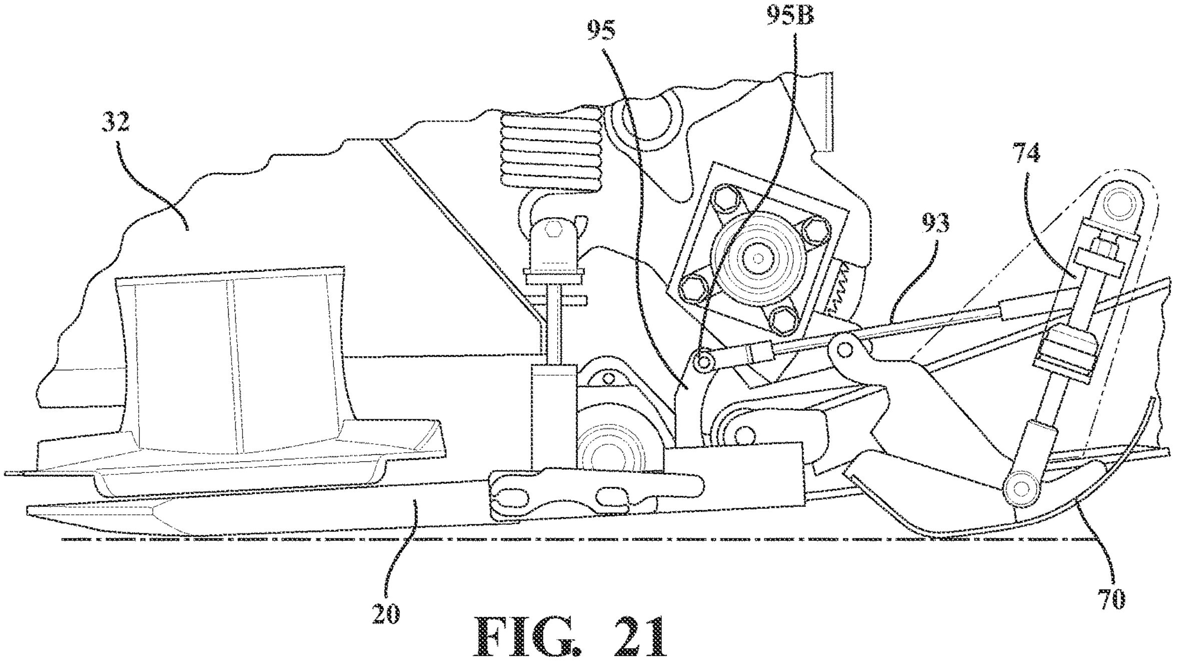
FIG. 21 is a side view of the floating cutterbar assembly illustrated in FIG. 3 in the middle of its float travel, attached a header and including a support mechanism.
Figure 22:
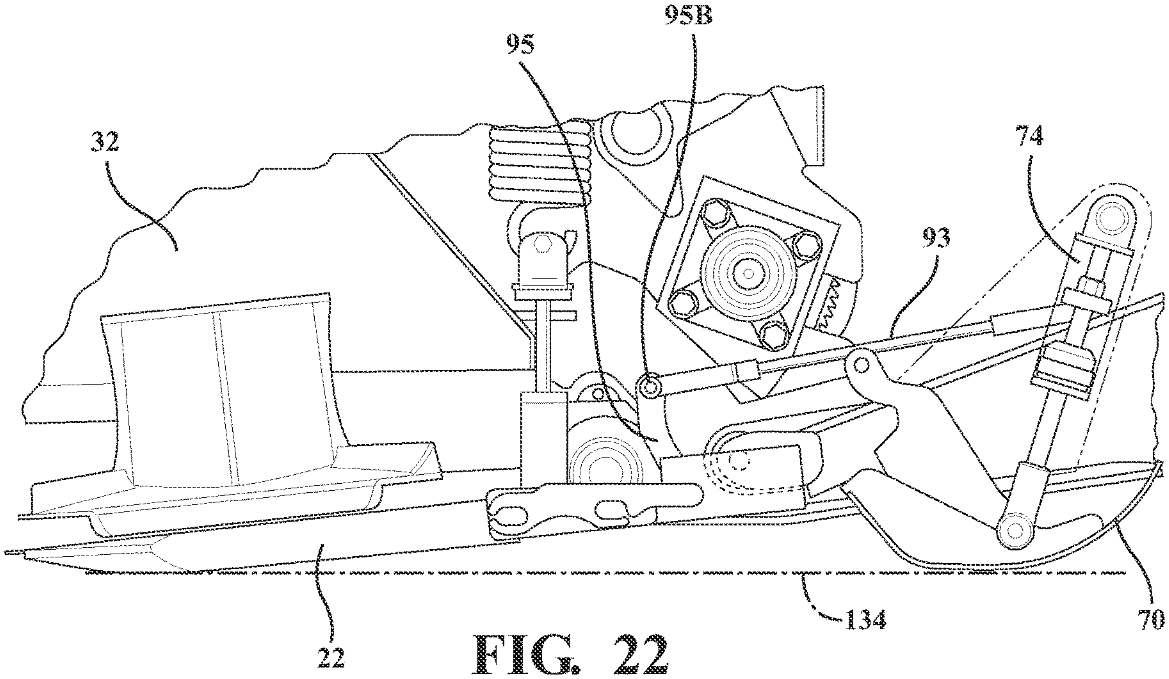
FIG. 22 is a side view of the floating cutterbar assembly illustrated in FIG. 3 at the bottom of its float travel, attached to a header, and including a support mechanism.

FIG. 20 illustrates the cutterbar 22 tilted all the way up and back to its minimum angle which yields a high stubble height of cut crops. In this arrangement, the cam arm second end 95B is positioned in its most rearward position. FIG. 21 illustrates the cutterbar 22 tilted to a mid-tilt position which yields a lower stubble height than the stubble height yield in FIG. 20. In this arrangement, the cam arm second end 95B is positioned more forwardly than its most rearward position shown in FIG. 20. FIG. 22 illustrates the cutterbar 22 tilted all the way down and forward to yield a low stubble height. In this arrangement, the cam arm second end 95B is positioned in its most forward position.

Figure 23:
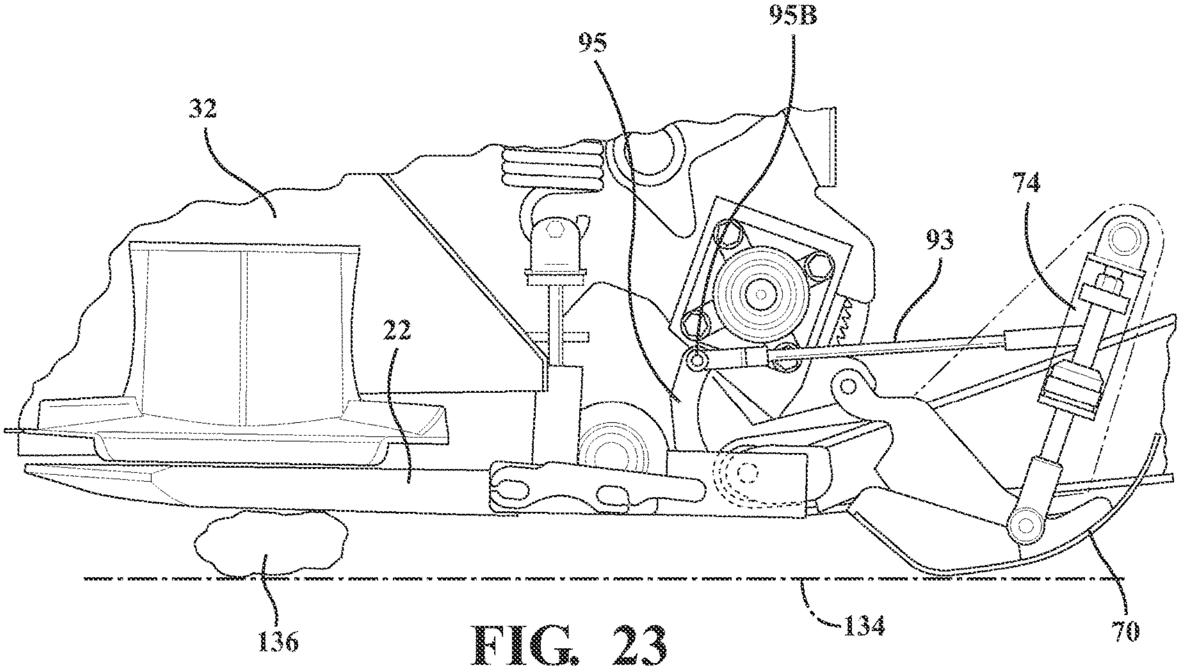
FIG. 23 is a side view of the floating cutterbar assembly illustrated in FIG. 3 in the middle of its float travel floating up over an obstacle.
Figure 24:
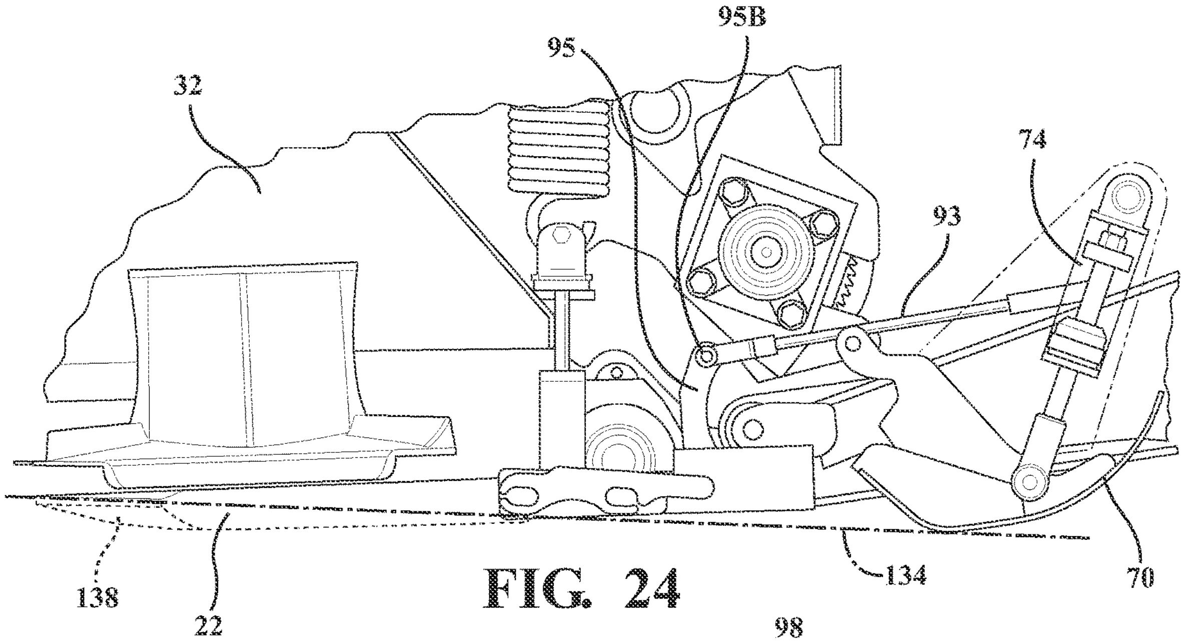
FIG. 24 is a side view of the floating cutterbar assembly illustrated in FIG. 3 in the middle of its float travel floating down into a depression in the ground.

FIGS. 23 and 24 illustrate how the cutterbar 22, when positioned in the mid-tilt position, "floats" over the ground in response to an obstacle or a depression in the ground 134 as the agricultural machine 37 traverses through a field to harvest crops. FIG. 23 illustrates the cutterbar 22 pivoting upward (i.e., floating up vertically) to clear an obstacle 136 such as a rock. FIG. 24 illustrates the cutterbar 22 pivoting downward (i.e., floating vertically down) to follow a depression 138 in the ground 134.

The above description applies to a system that is positioned on one side of the cutterbar 22. The header 38 may utilize a second, mirror-image system, including the same or substantially similar mechanisms, springs, and linkages, that is positioned on the other side of the cutterbar 22, to support the opposite end of the cutterbar 22.

Figure 25:
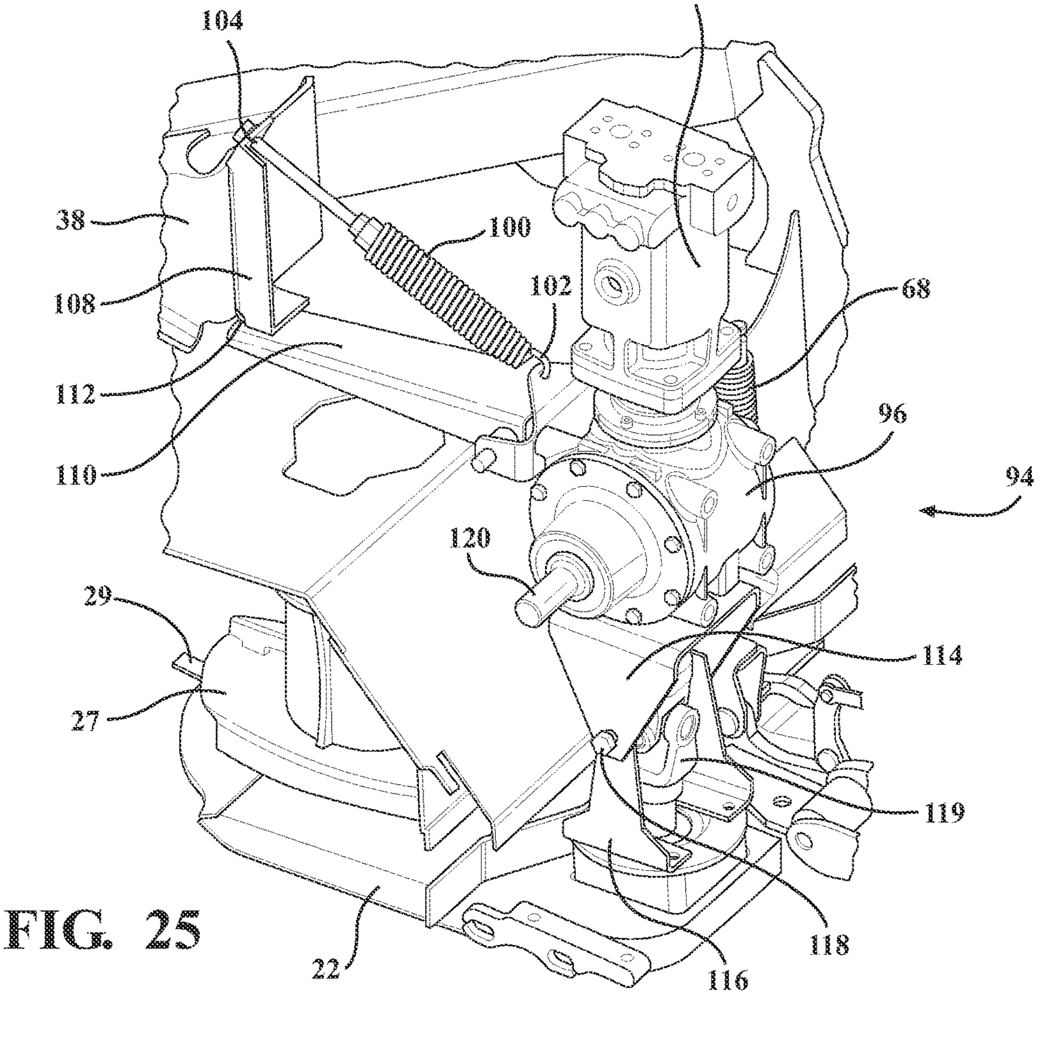
FIG. 25 is a partial perspective view of a section of the floating cutterbar illustrated in FIG. 3 including a motor, gearbox, and driveline.

Referring now to FIG. 25, the header 38 may further comprise a driveline 94. The cutterbar 22 is driven by the driveline 94, which comprises a motor 98, a gearbox 96, and a flexible coupling 119. The cutterbar 22 is driven by a first output shaft 99 on the bottom of the 90-degree gearbox 96, which in turn is driven by the hydraulic motor 98. All of these components are coupled to the cutterbar 22 and float along with the cutterbar 22 as the cutterbar 22 pivots to follow the ground. As illustrated herein, these components may be positioned on one side of the cutterbar 22. In order to support the weight of the driveline 94, a support spring 100 is utilized to carry the weight of the driveline 94, gearbox 96, and hydraulic motor 98 that are attached to the cutterbar 22. The spring 100 is attached at a first end 102 to the gearbox 96 and is attached to the header 38 at a second, opposite end 104. The first end 102 of the support spring 100 is attached to a first bracket 106 that is attached to the gearbox 96. The second end 104 of the support spring 100 is attached to a second bracket 108 that is attached to the header 38. A pivot arm 110 is pivotally connected to first bracket 106 at one end and attached to the second bracket 108 by a ball joint 112. The amount of lift that the support spring 100 exerts in the vertical direction is generally consistent throughout the float range of the cutterbar 22.

The spring 68 is positioned on one side of the header, as described above. There is a second, symmetrical spring positioned on the opposite side of the header that is not illustrated. The symmetrical float spring arrangement is possible due to the use of the support spring 100 to support the weight of the motor 98, the gearbox 96, and the driveline 94.

Figure 26:
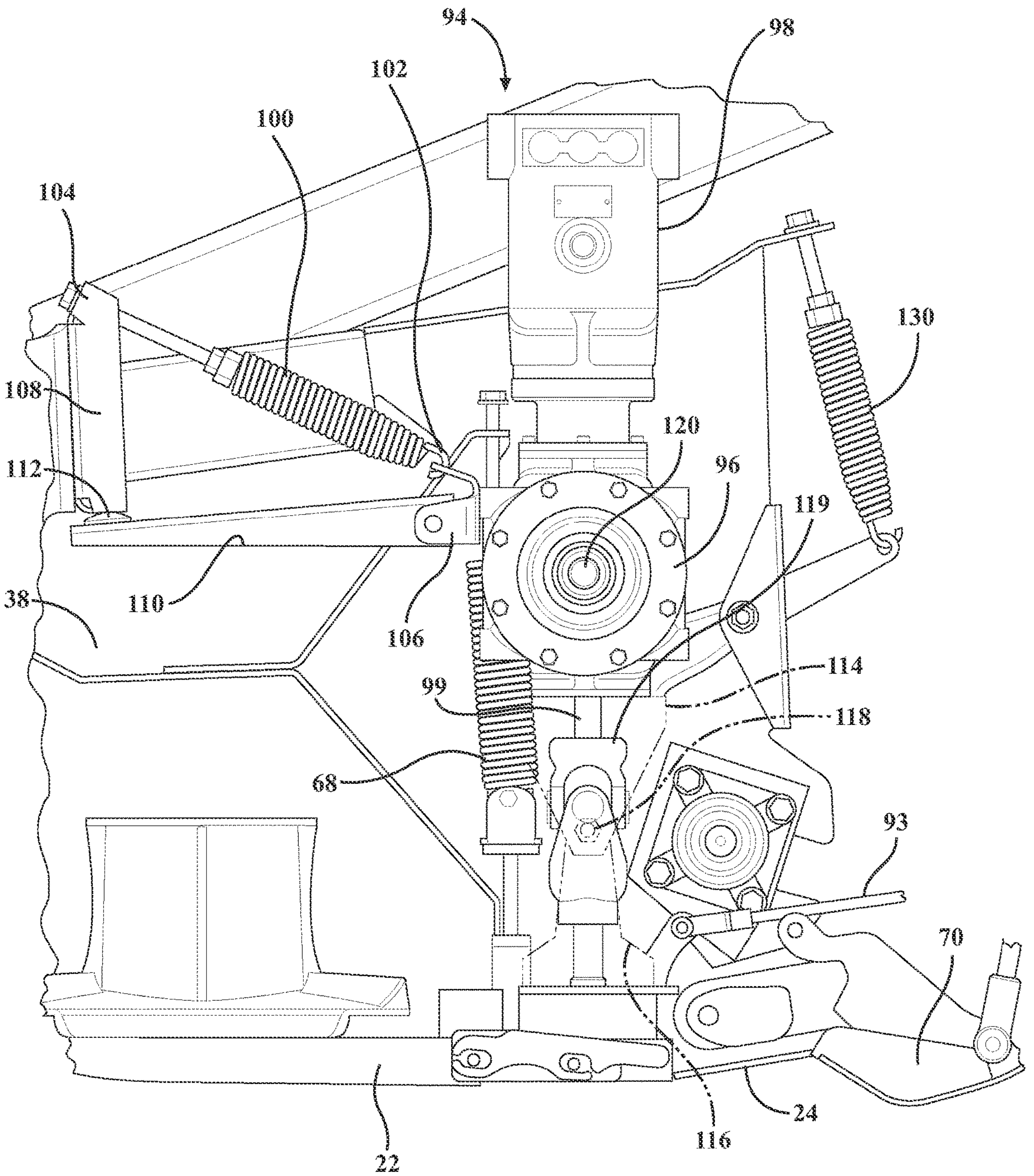
FIG. 26 is a partial side view of a section of the floating cutterbar illustrated in FIG. 3 including a motor, gearbox, and driveline.

Referring to FIGS. 25 and 26, the gearbox 96 is attached to a gearbox support 114. The gearbox support 114 is pivotally connected to a gearbox support base 116 at a pivot 118. The gearbox support base 116 is rigidly attached to the cutterbar 22. The pivot 118 is aligned with the center of the universal joint 119. As the cutterbar 22 pivots, the universal joint 119 is positioned such that the angle of the driveline causes minimal vibrations in the universal joint 119.

Figure 27:
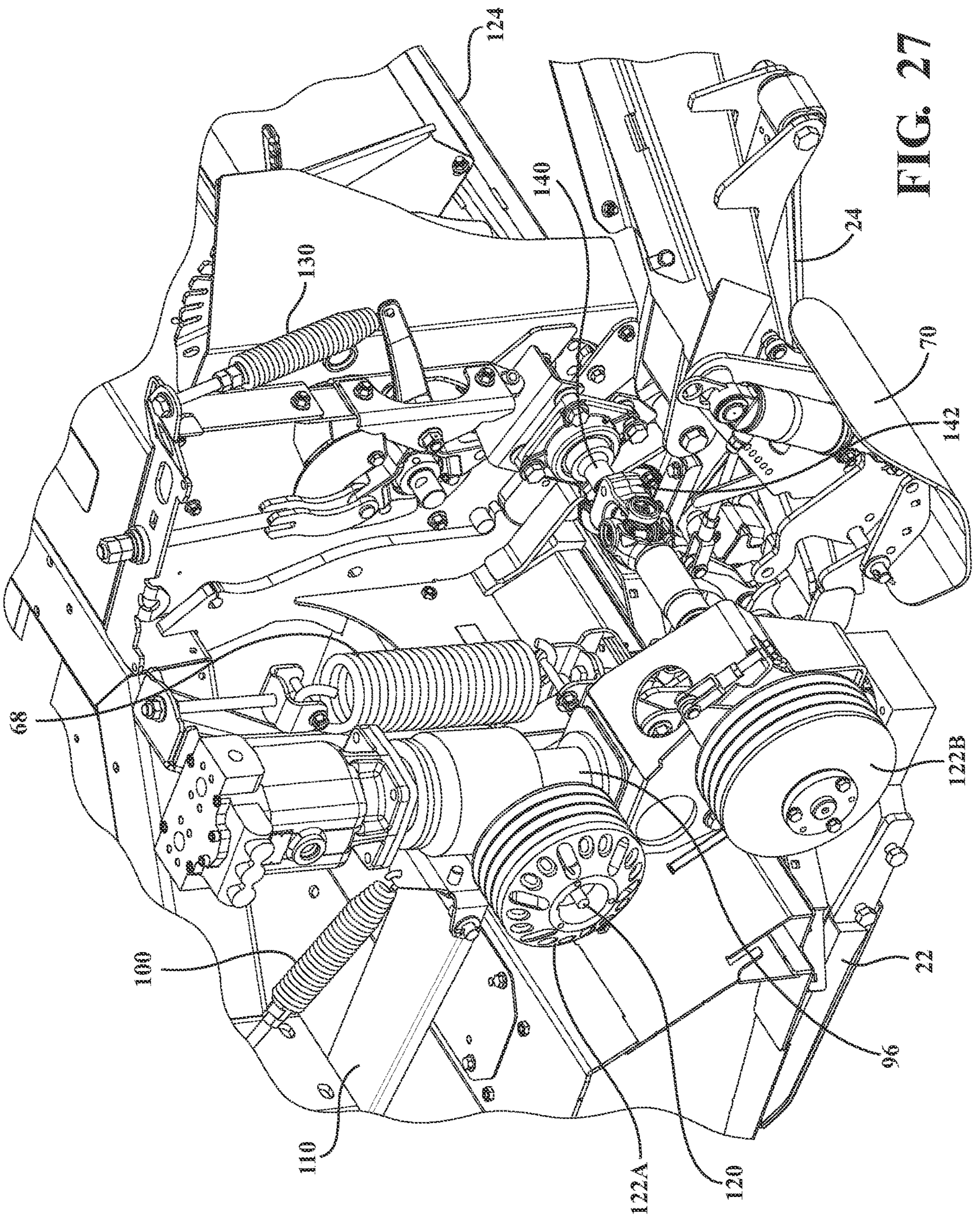
FIG. 27 is a partial perspective view of a section of the floating cutterbar illustrated in FIG. 3 including a motor, gearbox, driveline, and a belt drive.
Figure 29:
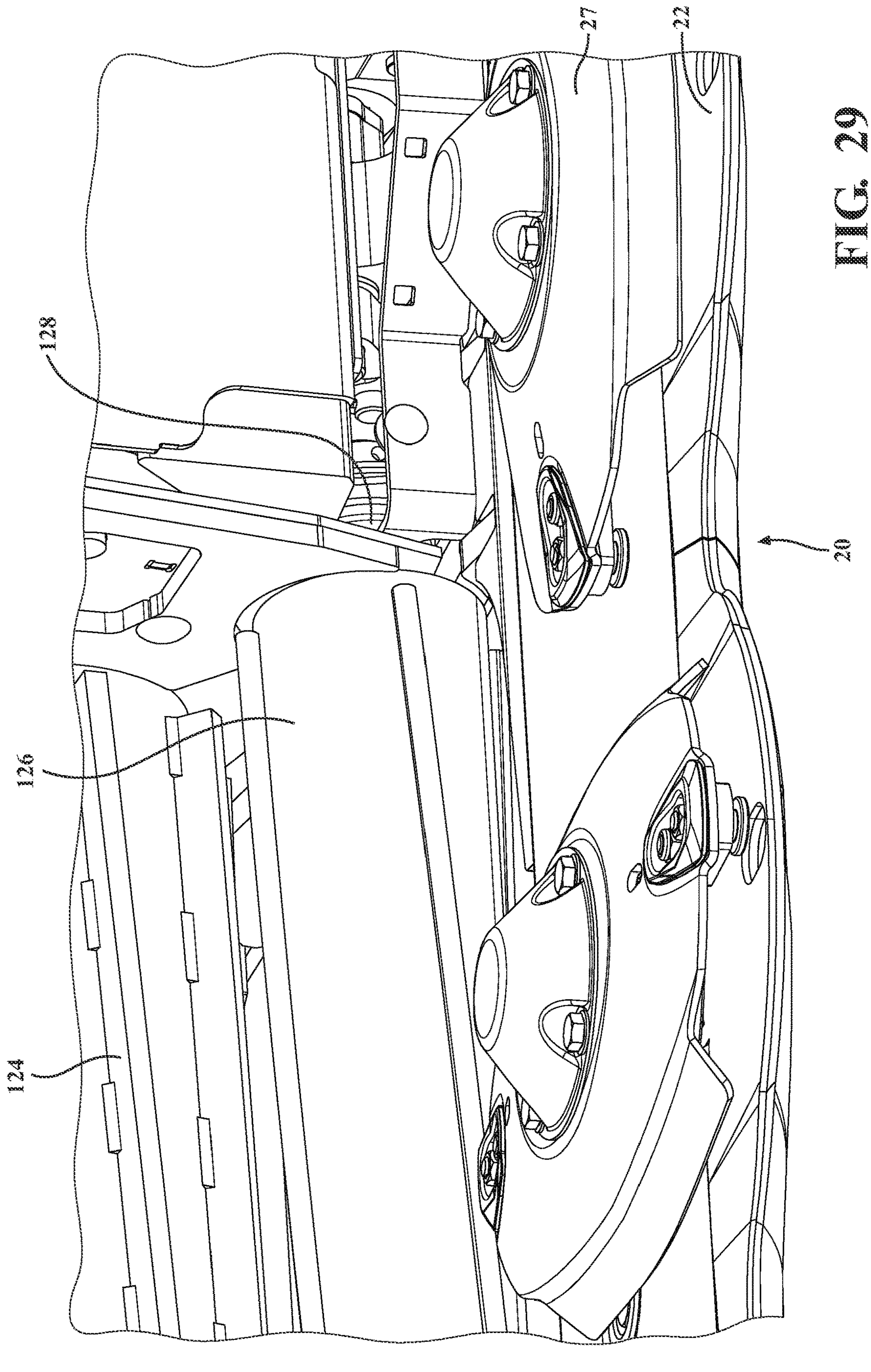
FIG. 29 is a partial perspective view of a section of the floating cutterbar illustrated in FIG. 3 including a conditioner roll.

Referring to FIG. 27, there is a second output shaft 120 extending out from the gearbox 96 with an attached belt drive 122A, 122B and driveline (the belt is not shown in FIG. 27) that drives the conditioner rolls 124, which are illustrated in FIG. 29. The belt drive includes a first drive pulley 122A coupled to the second output shaft 120, and a second drive pulley 122B coupled to a conditioner roll shaft 140 via a second universal joint 142. The conditioner roll shaft 140 rotates the conditioner rolls 124, which shape the cut crops into a windrow for further processing.

Figure 28:
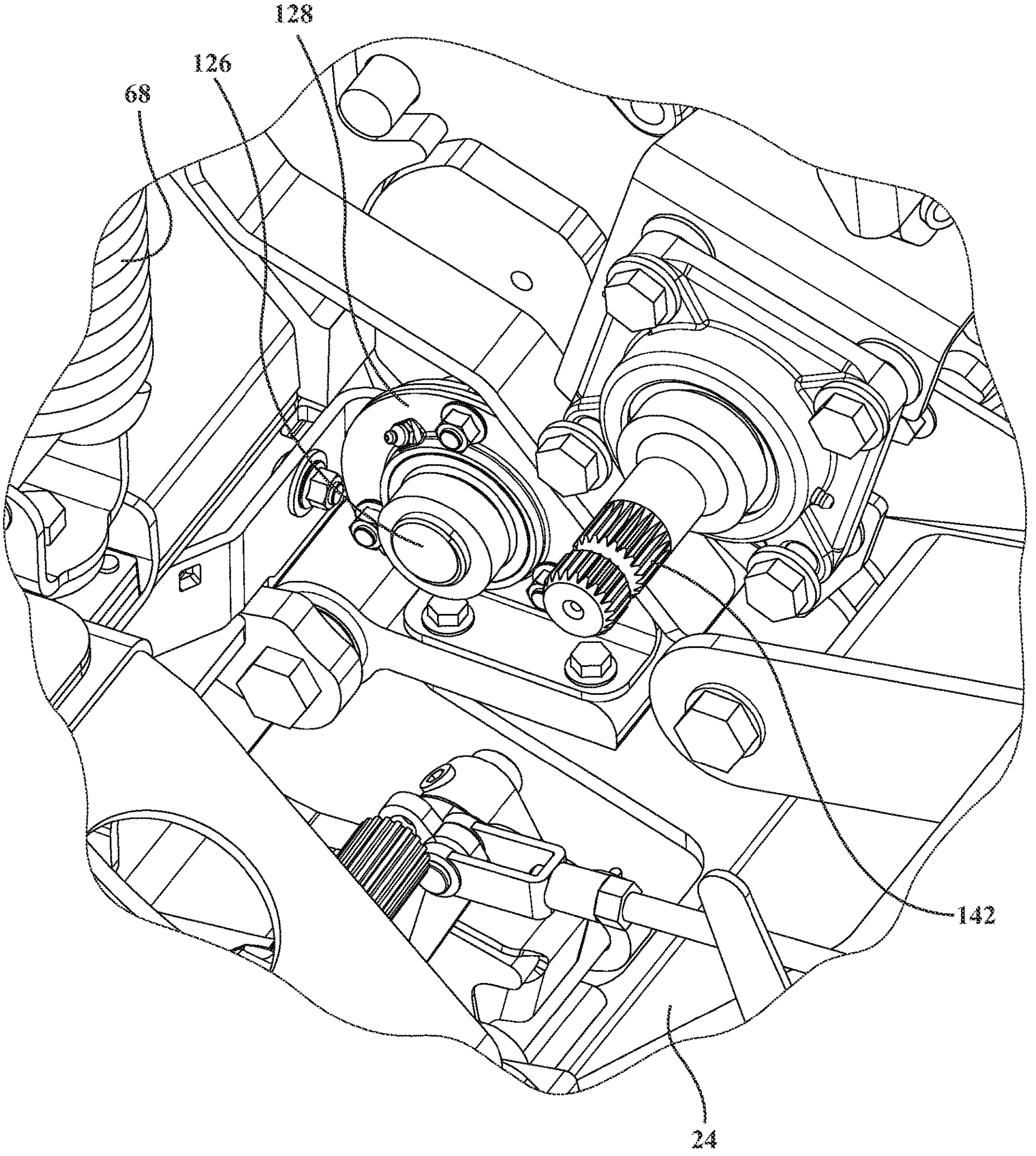
FIG. 28 is a partial perspective view of a section of the floating cutterbar illustrated in FIG. 3 including a feed roll shaft.

Referring to FIGS. 27-29, the position of the feed roll shaft 126 is generally consistent relative to the cutterbar 22 and floats with the cutterbar 22 on the float arm 24. Feed roll bearings 128 are mounted on the float arm 24 and rotatably support the feed roll shaft 126. Alternatively, the feed roll bearings 128 can be mounted to the cutterbar 22 itself. The feed roll shaft 126 is driven by a drive system (not shown) that rotationally couples the conditioner rolls 124 to the feed roll shaft 126. In operation, the feed roll shaft 126 floats with the cutterbar 22 and receives the crop that has been cut by the cutterbar 22, then delivers it to the conditioner rolls 124. A spring 130 coupled between the header frame 32 and the conditioner rolls 124 applies roll pressure to the conditioner rolls 124.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A header for an agricultural machine, the header comprising:

a support structure adapted to mount the header to the agricultural machine;

a header frame pivotally coupled to the support structure;

a floating cutterbar assembly operatively coupled to the header frame and pivotally coupled to the support structure, wherein the floating cutterbar assembly is moveable between a first position and a second position;

a spring coupled between the header frame and the floating cutterbar assembly for reducing a ground contact force on the cutterbar; and a support mechanism coupled to the support structure and operable to adjust a height of the header frame relative to the ground, wherein the support mechanism is pivotal relative to the support structure between a retracted position to lower the header frame and an extended position to raise the header frame.

2. The header of claim 1, wherein the support structure is couplable to the agricultural machine.

3. The header of claim 1, further comprising a float arm, wherein the floating cutterbar assembly is pivotally coupled to the float arm for pivoting movement about a generally horizontal axis between the first and second positions.

4. The header of claim 3, wherein the support structure comprises a lift linkage, and wherein the float arm has a first end and a second end, the float arm first end is coupled to the cutterbar, and the float arm second end is pivotally coupled to the lift linkage and configured to allow the floating cutterbar assembly to pivot relative to the lift linkage.

5. The header of claim 1, wherein the support mechanism is adapted to contact the ground during operation.

6. The header of claim 1, wherein the floating cutterbar assembly further comprises a linkage operably coupled to the support mechanism and movable to limit pivoting movement of the cutterbar.

7. The header of claim 6, wherein the linkage comprises a cam engageable with the cutterbar, and wherein movement of the support mechanism causes corresponding movement of the cam.

8. The header of claim 6, wherein the linkage limits pivoting movement of the cutter bar when the support mechanism is in the retracted position.

9. The header of claim 1, further comprising an actuator is coupled between the support mechanism and the header frame and configured to pivot the support mechanism between the extended position and the retracted position of the support mechanism.

10. The header of claim 1, further comprising a driveline coupled to the floating cutterbar assembly, and wherein the cutterbar assembly further comprises a cutting disc rotatably supported by the cutterbar and operably coupled to the driveline for rotating the cutting disc.

11. The header of claim 10, wherein the driveline comprises a motor, a gearbox, and a flexible coupling.

12. The header of claim 11, wherein the gearbox has an input coupled to the motor, a first output operably coupled to the cutting disc, and a second output, and wherein the first output and the second output are non-parallel.

13. The header of claim 12, further comprising a feed roll, wherein the feed roll is rotatably coupled to the floating cutterbar assembly.

14. The header of claim 13, wherein the feed roll is rotatably coupled to the float arm.

15. The header of claim 13, further comprising a conditioner roll, wherein the conditioner roll is operably coupled to the second output of the gearbox.

16. The header of claim 15, wherein the feed roll is operably coupled to the conditioner roll for concurrent rotation therewith.

17. The header of claim 10, further comprising a support spring arranged between the header frame and the driveline.

* * * * *